US008543438B1

(12) United States Patent
Fleiss

(10) Patent No.: US 8,543,438 B1
(45) Date of Patent: Sep. 24, 2013

(54) LABOR RESOURCE UTILIZATION METHOD AND APPARATUS

(76) Inventor: Joel E. Fleiss, Los Angeles, CA (US)

( * ) Notice: Subject to any disclaimer, the term of this patent is extended or adjusted under 35 U.S.C. 154(b) by 0 days.

(21) Appl. No.: 13/366,103

(22) Filed: Feb. 3, 2012

(51) Int. Cl.
*G06Q 10/00* (2012.01)
*G06Q 30/00* (2012.01)
*G06Q 40/00* (2012.01)

(52) U.S. Cl.
USPC ........ 705/7.13; 705/7.11; 705/7.12; 705/7.14; 705/7.15; 705/7.17; 705/7.22; 705/7.23; 705/7.25; 705/7.26; 705/7.38; 705/7.39; 705/7.41; 705/7.42

(58) Field of Classification Search
USPC .......................................................... 705/7.15
See application file for complete search history.

(56) References Cited

U.S. PATENT DOCUMENTS

| | | | | | |
|---|---|---|---|---|---|
| 5,111,391 | A | * | 5/1992 | Fields et al. ................. | 705/7.14 |
| 5,974,392 | A | * | 10/1999 | Endo ........................... | 705/7.14 |
| 6,442,459 | B1 | * | 8/2002 | Sinex .......................... | 701/33.9 |
| 6,580,982 | B2 | * | 6/2003 | Sinex .......................... | 701/29.3 |
| 6,675,130 | B2 | * | 1/2004 | Kanevsky et al. ........... | 702/188 |
| 6,681,210 | B2 | * | 1/2004 | Kelly .......................... | 705/32 |
| 6,684,136 | B2 | * | 1/2004 | Sinex .......................... | 701/29.4 |
| 7,082,404 | B2 | * | 7/2006 | Calderaro et al. ........... | 705/7.42 |
| 2002/0029161 | A1 | * | 3/2002 | Brodersen et al. ........... | 705/9 |
| 2002/0069001 | A1 | * | 6/2002 | Sinex .......................... | 701/29 |
| 2002/0082809 | A1 | * | 6/2002 | Kanevsky et al. ........... | 702/188 |
| 2002/0143444 | A1 | * | 10/2002 | Sinex .......................... | 701/29 |
| 2003/0004790 | A1 | * | 1/2003 | Calderaro et al. ........... | 705/11 |
| 2003/0004847 | A1 | * | 1/2003 | Calderaro et al. ........... | 705/36 |
| 2003/0120533 | A1 | * | 6/2003 | Popillo et al. .............. | 705/9 |
| 2005/0209902 | A1 | * | 9/2005 | Iwasaki et al. ............. | 705/8 |
| 2006/0072739 | A1 | * | 4/2006 | Baggenstoss et al. ..... | 379/265.05 |
| 2007/0073575 | A1 | * | 3/2007 | Yomogida .................. | 705/9 |
| 2008/0033791 | A1 | * | 2/2008 | Jones et al. ................. | 705/11 |
| 2009/0133027 | A1 | * | 5/2009 | Gunning et al. ............ | 718/103 |
| 2009/0150201 | A1 | * | 6/2009 | Dufresne et al. ........... | 705/7 |
| 2009/0222310 | A1 | * | 9/2009 | Vollmer et al. ............. | 705/8 |
| 2010/0030700 | A1 | * | 2/2010 | Mays .......................... | 705/36 R |
| 2010/0262653 | A1 | * | 10/2010 | Chaffee et al. ............. | 709/203 |
| 2011/0131082 | A1 | * | 6/2011 | Manser et al. ............. | 705/7.42 |

* cited by examiner

*Primary Examiner* — Leland Marcus
(74) *Attorney, Agent, or Firm* — Smyrski Law Group, A P.C.

(57) ABSTRACT

A method and apparatus that assesses the importance of projects in a portfolio of projects and allocates labor resources to multiple concurrent projects is provided. The method includes specifying clear project schedules that are readily testable for various projects and using labor categories for project schedule tasks requiring labor resources. The present design determines each project team member's productivity for each supported labor category and allocates project team members to the project tasks on a periodic basis such that the most important project tasks receive the most productive available project team members for each project's specified labor categories.

16 Claims, 39 Drawing Sheets

FIG. 1B-1

| MEMBER NAME | DATA TYPE | DESCRIPTION |
|---|---|---|
| Accessibility | Link | A link to the Project List database for the projects this individual can access. |
| Activity Hours | Number | How many hours each week are assigned to perform corporate activities? |
| Additional Locations | Link | The Location of other facilities than the primary location that this individual is willing to work at. An Administrator establishes a list of possible locations. |
| ADM | Boolean | Indicates this user has Administration privileges. |
| Administrator | Boolean | An indicator as to whether this individual shall have Administrator access rights. |
| Approval | Boolean | Approval indicator. |
| BA | Boolean | Indicates this user has Business Analyst privileges. |
| Cell Phone | Link | The cell phone of this individual. This is a link to the String Table. |
| Date of Last Login | Date | Date this user last logged into EPPORA. A zero signifies that this user has never logged into EPPORA |
| Email | Link | This individual's e-mail address. This is a link to the String Table. |
| Ex | Boolean | Indicates this user has Executive privileges. |
| Fax | Link | This individual's facsimile number. This is a link to the String Table. |
| Friday Hours | Number | Default number hours worked each Friday. |
| Hourly Rate | Cost | The hourly burdened rate for this individual. |
| Job Title | Link | Title of individual. This is a link to the String Table. |
| Labor Category | Link | A link to the labor categories this user supports in the Labor Resource List database. |
| Login Status | Boolean | A one indicates this user is logged into EPPORA now. |
| Monday Hours | Number | Default number hours worked each Monday. |
| Name | Link | The individual's name. This is a link to the String Table. |

← FROM FIG. 1B-1

| | | |
|---|---|---|
| Non Project Hours | Number | Number of hours unassigned to a project since the start of the year. |
| Number of Labor Categories | Number | The number of different labor categories this user supports. |
| Number of Login Attempts | Number | Number of failed logins. |
| Number Locations | Link | The number locations that this individual is willing to work at. |
| Number Projects | Number | Number of projects this user can access. |
| Number Completed Tasks | Number | The number of tasks this individual is assigned to for the current allocation period. |
| Number Tasks | Number | Number Tasks User is currently performing this allocation. |
| Ongoing Projects | Number | The number of incomplete projects this individual is working on during the current allocation period. |
| Ongoing Tasks | Link | A link to the initial task in the Task List database structure that this individual is working on during the allocation period. |
| Password | Link | The user password. Password is contained in String Table, but is encrypted. The encryption algorithm takes each character and depending whether it is an odd or even character, adds or subtracts a specific value and assumes circular alphabet. |
| Primary Location | Link | The primary location the user works at. |
| Project Hours | Number | Number of hours worked this year on projects. |
| Project Hours | Number | Number of hours individual has worked on projects this year. |
| PM | Boolean | Indicates this user has Project Manager privileges. |
| PPM | Boolean | Indicates this user has Project Portfolio Manager privileges. |
| Project Portfolio Manager List | Link | A list of projects that this user is the Project Portfolio Manager. |
| PTM | Boolean | Indicates this user has Project Team Member privileges. |

→ TO FIG. 1B-3

FIG. 1B-3 ← FROM FIG. 1B-2

| | | |
|---|---|---|
| Projects Managing | Link | A link to a list of projects in the Project List database structure that this user is the Project Manager. |
| Question1 | Link | The response to the first user question. This is a link to the String Table. The response is encrypted. |
| Question2 | Link | The response to the second user question. This is a link to the String Table. The response is encrypted. |
| Question3 | Link | The response to the third user question. This is a link to the String Table. The response is encrypted. |
| Sick Days | Number | A count of sick days this individual has taken this year. |
| Special Days | Count | A count of the number of special days for this user. |
| Special Days | Link | Pointer to list of days special for this staff member. |
| Starting Date | Date | The date this individual started working at the organization. |
| Supervisor | Link | Link to this Project Team Member's supervisor in the Personnel database structure. |
| Telephone | Link | Individual's telephone number. Link to the String database. |
| Thursday hours | Number | Default number hours worked each Thursday. |
| Time of Last Login | Time | Time user last logged into system. |
| Tuesday hours | Number | Default number hours worked each Tuesday. |
| User ID | Number | Unique identification for this user. |
| Vacation Days | Number | Number of vacation days this individual has taken this year. |
| Vacation Days Planned | Number | Number of planned future vacation days for this year. |
| Wednesday Hours | Number | Default number hours worked each Wednesday. |
| Weekend Hours | Number | Default number hours worked each weekend. |
| Work Calendar | Link | A link to the calendar this user supports. |
| Work Hours | Number | Number work hours per day |

| CRITERION NUMBER | DEFAULT WEIGHT | CRITERION NAME |
|---|---|---|
| 1 | 3 | Alignment Organization Goals |
| 2 | 4 | Alignment Product |
| 3 | 2 | Available Expertise |
| 4 | 3 | Cash Flow |
| 5 | 3 | Competitive Advantage |
| 6 | 2 | Conformance |
| 7 | −5 | Cost |
| 8 | 2 | Enabler |
| 9 | 5 | External Contract |
| 10 | −2 | Financial Risk |
| 11 | 2 | Government Regulations Conformance |
| 12 | −1 | Management Risk |
| 13 | 2 | Negative Consequences |
| 14 | 2 | Project Enabler |
| 15 | 5 | ROI Year 1 |
| 16 | 4 | ROI Year 2 |
| 17 | 3 | ROI Year 3 |
| 18 | −3 | Schedule Risk |
| 19 | 4 | Security |
| 20 | 3 | Success Factor |
| 21 | 3 | Synergism with Organization |
| 22 | 3 | Synergism with Projects |
| 23 | −4 | Technical Risk |
| 24 -- ∞ | 0 | User Defined |

| ACTIVITY | ROLE | WHEN |
|---|---|---|
| Criterion | Specify and/or modify the weight (importance) of each criterion used to determine the ranking of projects. Determine who shall evaluate each criterion for their division's projects. | Whenever a project ranking factor is determined to be of more or less importance than previously specified. |
| Requirements Review | Verify that the new or updated requirements satisfy/conform to industry and the organization's standards and then approve the requirements. | Whenever the Business Analyst changes the requirements specification. |
| Schedule Review | Verify that the new or updated schedules satisfy/conform to industry and the organization's standards and then approve the updated schedule. | Periodically whenever the Project Manager adjusts the schedule. |
| Triggers | Determine who should be notified for each trigger. | At trigger specification. |
| Salary Adjustment | Recommend salary adjustments for Project Team Members and Project Managers to the appropriate Executives. | Depends on organization's guidelines. Executives have ability to alter the hourly salary, which usually occurs when a Project Portfolio Manager recommends an adjustment for his/her staff at a company specified date. |
| Labor Categories | Create new labor categories as needed by the projects. Assign labor categories to users. Delete labor categories that are not needed. | Whenever a new labor category is needed or on existing labor category is no longer needed. |
| Options | Specify default options that best serve the organization. | At EPPORA's installation and whenever a major change occurs to the project environment causing a more effective option being needed. |
| Productivity Adjustment | Adjust EPPORA's productivity calculations for a Project Team Member based on the quality of the result or the complexity of the project task. | Whenever extraordinary factors are involved with a project's task completion. |
| Managing Project Managers | Designate, mentor and monitor the Project Managers for multiple projects. | At project start, at the completion of milestones and/or deliverables, when a milestone or deliverable is late or when the Project Manager needs to make a change to accommodate special circumstances. |
| Managing Business Analysts | Designate, mentor and monitor the Business Analysts for a project. | At project start, at the completion of milestones and/or deliverables, when the Business Analyst needs to make a change to accommodate special circumstances. |

FIG. 1E-1

| DATABASE STRUCTURE | DESCRIPTION |
|---|---|
| Available Personnel | Used to contain potential personnel during an allocation. |
| Baseline | Used to construct a file for each project's different baselines. |
| Column Content | The contents of a column for a report. |
| Dependency List | A list of dependencies for a low-level task. |
| Dictionary-Adjectives | A list of pointers to the String database for words that are adjectives. |
| Dictionary-Adverbs | A list of pointers to the String database for words that are adverbs. |
| Dictionary-Nouns | A list of pointers to the String database for words that are nouns. |
| Dictionary-Synonyms | A list of synonyms for adjectives, adverbs, nouns and verbs. |
| Dictionary-Verbs | A list of pointers to the String database for words that are verbs. |
| Events | A list of user actions (or emulated scripting actions) from the Internet. |
| Generic Resource List | A list of generic labor resources for a project task. |
| Inventory | All the relevant information about the inventory being used for the project portfolio. |
| Inventory List | A list of inventory items used for the implementation of a task. |
| Issue Summary | A summary of issues encountered during the previous day and at the end of business processing. |
| Labor Category | All the relevant information about labor categories for an organization. |
| Labor Resource List | A list of the required labor resources for a task. |
| Last Day of Month | A fixed table with the last days of the month. An Administrator can adjust the February entry. |
| Location | The location the user is working at. |
| Location List | A list of locations that a user is willing to work at. |

TO FIG. 1E-2

| | |
|---|---|
| Log | History of all EPPORA activities for the current month. |
| Missing Inventory | A list of inventory items missing from tasks during the current allocation period. |
| Missing Labor Resources | A list of missing labor resources from tasks during the current allocation period. |
| Other Task Cost | A list of cost associated with a task that are not labor or inventory. |
| Other Task Cost List | A set of pointers to the "Other Task Cost" database for other cost items. |
| Personnel | All the relevant information for all members of the organization participating in projects. |
| Project | All the relevant data for each project in an organization's project portfolio. |
| Project List | A list of projects. |
| Project Schedule | All the relevant data for each project task in the project portfolio. |
| Report | The description of customized reports. |
| Requirements | All the relevant information about the requirements for each project in the project portfolio. |
| Requirements List | A list of requirements that is dependent upon another requirement. |
| Requirements Mapping List | An entry for low-level requirements containing pointers to the tasks needed to complete this requirement. |
| Special Days | A list of special non-working days for each user. |
| String Stack | A text string represents each character using Unicode (16-bits). |
| Task List | A list of tasks. |
| User Defined Reports | An entry for each user defined report. |
| User Labor Category List | Contains the labor categories supported by each user. |
| User List | A series of pointers to the Personnel database for a set of users. |
| Work Calendar | A calendar used by one or more users describing their workdays. |

FIG. 1E-2

| MEMBER NAME | DATA TYPE | DESCRIPTION |
| --- | --- | --- |
| Column List | Link | Pointer to set of columns for this report. |
| Number Columns | Number | A count of how many columns in this report. |
| Number Projects | Number | A count of how many projects in this report. |
| Project List | Link | A pointer to a list of projects. |
| Report Customization List | Link | A pointer to list of customized reports for this report type. |
| Report Identification | Enumeration | Which base report the information is to come from when obtaining the column's value. |
| Report Name | Link | A pointer to String Table for name of report. |
| Space | Number | The space between each column. |
| User list | Link | Pointer to users who can access report. A null list signifies all users can access report. |

| MEMBER NAME | DATA TYPE | DESCRIPTION |
| --- | --- | --- |
| Report | Link | A list of reports (default and customized) for this report type. Each is a pointer to a report. |

FIG. 1F

| MEMBER NAME | DATA TYPE | DESCRIPTION |
|---|---|---|
| Criterion | Link | Pointer to criterion being scored. |
| Date | Date | Date score was specified. |
| Project | Link | Pointer to project being scored. |
| Score | Number | Score (value) given to designated project for this criterion. |
| Scorer | Link | Pointer to individual user who last scored this criterion. |
| Time | Time | Time score was specified. |

FIG. 4B

ARA:- Criteria

| Home | Reports | Project | Administration | Help |

ARA Project Criteria Summary 461

| Action | Division | Criteria Name | Weight (Importance) | Responsibilities |
|---|---|---|---|---|
| ✐ | Los Angeles | Alignment Organization Goals | 3 | Joel Fleiss |
| ✐ | Los Angeles | Alignment Project Goals | 4 | Joel Fleiss |
| ✐ | Los Angeles | Available Expertise | 2 | Joel Fleiss |
| ✐ | Los Angeles | Cash Flow | -3 | Joel Fleiss |
| ✐ | Los Angeles | Competitive Advantage | 3 | Stephanie Bowers |
| ✐ | Los Angeles | Conformance | 2 | Rob Eder / Joel Fleiss |
| ✐ | Los Angeles | Cost | -5 | Rob Eder |
| ✐ | Los Angeles | Enabler | 2 | Joel Fleiss |
| ✐ | Los Angeles | External Contract | 5 | Joel Fleiss |
| ✐ | Los Angeles | Financial Risk | -2 | Rob Eder / Joel Fleiss |
| ✐ | Los Angeles | Government Regulations | 2 | Rob Eder |
| ✐ | Los Angeles | Management Risk | -1 | Rob Eder |
| ✐ | Los Angeles | Negative Consequences | 2 | Joel Fleiss |
| ✐ | Los Angeles | Project Enabler | 2 | Joel Fleiss |
| ✐ | Los Angeles | ROI Year 1 | 5 | Rob Eder |
| ✐ | Los Angeles | ROI Year 2 | 4 | Rob Eder |
| ✐ | Los Angeles | ROI Year 3 | 3 | Rob Eder |
| ✐ | Los Angeles | Schedule Risk | -3 | Rob Eder |
| ✐ | Los Angeles | Security | 4 | Lawrence Le Blanc |
| ✐ | Los Angeles | Success Factor | 3 | Rob Eder / Joel Fleiss |
| ✐ | Los Angeles | Synergy With Organization | 3 | Joel Fleiss |
| ✐ | Los Angeles | Synergy With Other Projects | 3 | Joel Fleiss |
| ✐ | Los Angeles | Technical Risk | -4 | Rob Eder |

Insert New

ARA: – Attributes

EPS EPPOSA Project: Project Attributes   Welcome: Joel Fleiss  [Logout]

*Enterprise Portfolio Software*

[Home] [Reports] [Project] [Administration] [Help]

Division: Los Angeles  Current Baseline: 1

Project Status: Unapproved  Fixed Start Date:

Project Name: EPS Office Building  Project Start Date: 04/01/2011

Project Manager Assignment: Margot Eder  Fixed End Date:

Project Portfolio Manager Assignment: Marilyn Fleiss  Estimated Finish Date: 07/14/2013

Sponsor: Bill Gates  Estimated Total Hours: 22,300

Business Analyst Assignment: Joel Fleiss  Percentage Complete Hours: 4%

Critical Path Factor: 0  Number of Requirements: 1,322

Total Ranking Score: 191  Number of Schedule Tasks: 2,342

Completed Tasks: 79

[Analyze Project] [Baseline] [Requirements] [Schedule] [Test] [Save] [Cancel]

Version: 8/2/11 10am

ARA: - Tasks

EPS EPPORA Project: Schedule Task    Welcome: Joel E. Fleiss [Logout]

*Enterprise Portfolio Software*

[Home] [Reports] [Project] [Administration] [Help]

EPPORA Implementation

| ID | LEVEL | SCHEDULE TITLE | SCHEDULE DESCRIPTION | % | COST | DEPENDENCIES | EFFORT | ETD |
|---|---|---|---|---|---|---|---|---|
| 1 | 0 | EPPORA Implementation | Create EPPORA Product | 0 | $1,276,300 | | 5672 | 0 |
| 2 | 1 | Initiation Phase | Perform Initiation Phase Tasks | 0 | $ 36,000 | | 920 | 0 |
| 3 | 2 | Project Failure | Determine Causes of Project Failure | 0 | $ 3,500 | | 312 | 0 |
| 4 | 3 | Research | Research Failure Causes via Internet | 0 | $ 1,200 | | 160 | 0 |
| 5 | 3 | Interviews | Interview Key Executives | 0 | $ 1,000 | 4 | 120 | 0 |
| 6 | 3 | Compile List | Create List of Why Projects Fail | 0 | $ 200 | 5 | 16 | 0 |
| 7 | 2 | EPPORA Mitigation | Build List EPPORA Major Features to Mitigate Failure | 0 | $ 1,100 | 6 | 16 | 0 |
| 8 | 2 | Business Plan | Create Business Plan | 0 | $ 32,500 | 7 | 608 | 0 |
| 9 | 3 | Initial Version | Build Initial Version | 0 | $ 15,600 | 9 | 320 | 0 |
| 10 | 3 | Update Initial Version | Update Initial Version | 0 | $ 13,900 | | 80 | 0 |
| 14 | 1 | Design Phase | Perform Design Phase Tasks | 0 | $ 239,450 | 7 | 1740 | 0 |
| 15 | 2 | Implementation Strategy | Determine Imp ACTIONS (ID=15) | 0 | $ 19,200 | 15 | 24 | 0 |
| 16 | 2 | Database Requirements | Define Databas Delete this item only | 0 | $ 86,100 | 16 | 80 | 0 |
| 17 | 2 | Major Components Design | Define Major E Delete with children | 0 | $ 134,150 | 16 | 1388 | 0 |
| 18 | 3 | Allocation Processor | Specify functio Demote | 0 | $ 17,500 | 18 | 24 | 0 |
| 19 | 3 | Backup Processor | Specify functio Edit full record | 0 | $ 4,500 | 19 | 24 | 0 |
| 20 | 3 | Budget Analyzer | Specify functio Edit inline | 0 | $ 13,650 | 21 | 24 | 0 |
| 21 | 3 | Calendar Processor | Specify functio Insert above | 0 | $ 11,100 | 22 | 24 | 0 |
| 22 | 3 | Criteria Evaluator | Specify functio Insert below | 0 | $ 3,220 | 20 | 24 | 0 |
| 23 | 3 | Criteria Processor | Specify functio Map | 0 | $ 1,300 | 24 | 48 | 0 |
| 24 | 3 | Critical Path Processor | Specify functio Test | 0 | $ 1,750 | 19 | 16 | 0 |
| 25 | 3 | Dictionary Processor | Specify functio Customize | 0 | $ 850 | | 16 | 0 |
| 26 | 3 | Division Processor | Specify functio | 0 | $ 560 | | | |

[Go back to Projects]    [Analyze]    [<< First] [< Previous] [> Next] [>> Last]

| MEMBER NAME | DATA TYPE | DESCRIPTION |
|---|---|---|
| Criterion | Link | Pointer to criterion being scored. |
| Date | Date | Date score was specified. |
| Project | Link | Pointer to project being scored. |
| Score | Number | Score (value) given to designated project for this criterion. |
| Scorer | Link | Pointer to individual user who last scored this criterion. |
| Time | Time | Time score was specified. |

FIG. 5E

Activities include:

Daily:

Initialization
1. Delete each user's previous task assignments.
2. Delete each user's previous messages.

LABOR CATEGORIES
1. Verify that at least one labor category exist (PPMs).
2. Verify when new users belong to a labor category or a user no longer supports a labor category or a user that belongs to a labor category has a change in hourly salary then the average, highest and lowest hourly salary are computed for the labor category.

DIVISIONS
1. Verify that at least one "Division" exists (ADMs).
2. Verify each existing "Division" has at least one user assigned to it (ADMs).
3. Compute the exchange rate for each division for the coming day.

USERS
1. Verify that each user has a supervisor specified, except if the user has a job title of CEO or President (PPMs).
2. Verify that each user has one or more labor categories specified (PPMs).
3. Verify that each user has a work telephone number specified (PPMs).
4. Verify that each user has an email address specified (PPMs).

CRITERIA
1. Verify that each criterion with a non-zero weight has one or more users' assigned responsibility (PPMs).
2. Verify that at least one criterion has a non-zero weight (PPMs).
3. Verify that the ranking score for each project has been updated per the specified update period (PPMs).
4. Verify if a criterion's weight changes, new criterion are added, a criterion is deleted the project portfolio rankings are calculated.
5. Verify that if a criterion's score for a project is provided during the current day, that the designated project's ranking is calculated.

TRIGGERS
1. Verify that each enabled trigger has one or more users specified as part of the contact list (PPMs).

PROJECTS
1. Verify that each project has a Project Manager specified (PPM/P).
2. Verify that each project has a Business Analysts specified (PPM/P).
3. Verify that each project has a Project Portfolio Manager specified (PPMs).
4. Verify that each project has a Sponsor specified (PPM/P).
5. Verify that the requirements are specified for each project (PPM/P, BA/P).
6. Verify that the schedule is specified for each project (PPM/P, PM/P).

TO FIG. 5F-2

FIG. 5F-1

FROM FIG. 5F-1

REQUIREMENTS
1. Verify that each requirement's description contains the word "shall" (PPM/P, PM/P, BA/P).
2. Verify that each requirement's description does not contain any adjectives (PPM/P, PM/P, BA/P).
3. Verify that each requirement's description does not contain any adverbs (PPM/P, PM/P, BA/P).
4. Verify that each requirement's description does not contain any complex words (PPM/P, BM/P, BA/P).
5. Verify that each requirement's description is not a compound statement (PPM/P, PM/P, BA/P).
6. Verify that each requirement's description does not exceed the maximum number of words allowed (PPM/P, PM/P, BA/P).

PROJECT'S SCHEDULE
1. Verify that each task starts with a verb (PM/P, PM/P).
2. Verify that each low-level task has generic labor resources assigned (PMP/P, PM/P).
3. Verify for current allocation period each low-level task has an actual resource assigned for each required labor category (PMP/P, PM/P).
4. Verify that the numbers of fixed dates for low-level tasks are within the organization's threshold (PMP/P, PM/P).
5. Verify low-level tasks have no resource assigned for over maximum effort per low-level task, where default is 40 hours (PMP/P, PM/P).
6. Verify that no high-level tasks (parent task) has resources assigned (PMP/P, PM/P).
7. Verify that the schedule has been updated daily (PMP/P, PM/P).
8. Verify that no deliverable is late (PMP/P, PM/P, SP/P).
9. Verify that no deliverable is projected to be over a week (default value) late (PMP/P, PM/P, SP/P).
   Verify that no milestone is late (PMP/P, PM/P 14    1 low-level requirement is linked to one or more test cases.

PROJECT'S REQUIREMENTS MAPPING
1. Verify that each low-level requirement is mapped to one or more low-level project tasks (PMP/P, PM/P, BA/P, SP/P).
2. Verify that the percentage of each low-level task used relative to mapping is 100% (PMP/P, PM/P, BA/P, SP/P).
3. Verify that each low-level task is mapped to one or more requirements (PMP/P, PM/P, BA/P, SP/P).

FROM FIG. 5F-2

INVENTORY
1. Verify that there is at least one of each inventory item (PPM).
2. Verify there are enough inventory items for the current allocation period to complete each task (PPM).

ALLOCATION
1. Allocate actual labor resources for each approved project daily and post the tasks to each user's workflow.

MONTHLY
1. Clean up information for deleted projects.
2. Clean up information for deleted users.

YEARLY
1. Reset expended hours for each supported labor category to default hours if higher for each user.
2. Reset actual hours to coincide with current productivity value for each user.
3. Adjust labor category hours expended.
4. Initialize new calendar year.

FIG. 5F-3

| STEP | TASK TITLE | TASK DESCRIPTION |
|---|---|---|
| 1 | Available Hours | Compute available hours for each staff member for the allocation period. Must consider any planned vacation days and each user's specified hours of work per day. |
| 2 | Division | Note that assignment of staff must consider divisions. EPPORA can only assign a staff member if he supports the division of the project task's that is being allocated. End-of-Business occurs separately for each division. This means that when a division is in "End-of-Business" mode, all individuals supporting the division are locked out until End-of-Business processing is completed. This means we are only processing/analyzing information for one division at a time. |
| 3 | Project Schedule Tasks | Gather all the low-level tasks that will be completed in the allocation period for each project into a data structure which for this document we will call "TasksCurrentPeriod". |
| 4 | Pre-Assigned Tasks | Designate actual assigned resources for designated tasks in TasksCurrentPeriod. If any of the tasks with assigned resources has no other needed resources, move entry to "TasksAllocated". |
| 5 | Project Manager | Designate actual assigned resources for designated tasks in TasksCurrentPeriod specifying a Project Manager with the project's Project Manager. If any of the tasks with assigned resources has no other needed resources, move entry to "TasksAllocated". If the resource is missing, do not move the task and generate a missing resource message to the Business Analyst and the Project Portfolio Manager. If assignment, adjust available hours for individual being assigned. |
| 6 | Business Analyst | Designate actual assigned resources for designated tasks in TasksCurrentPeriod specifying a Business Analyst with the project's Business Analyst. If any of the tasks with assigned resources has no other needed resources, move entry to "TasksAllocated". If the resource is missing, do not move the task and generate a missing resource message to the Project Manager and the Project Portfolio Manager. If assignment, adjust available hours for individual being assigned. |
| 7 | Project Portfolio Manager | Designate actual assigned resources for designated tasks in TasksCurrentPeriod specifying a Project Portfolio Manager with the project's Project Portfolio Manager. If any of the tasks with assigned resources has no other needed resources, move entry to "TasksAllocated". If the resource is missing, do not move the task and generate a missing resource message to the Project Manager and the Business Analyst. If assignment, adjust available hours for individual being assigned. |

FROM FIG. 5G-1

| | | |
|---|---|---|
| 8 | Partially Completed Tasks | For tasks which are partially completed, assign the original project team member and adjust his/her hours accordingly. If the task will be completed move to "TasksAllocated". |
| 9 | Partial Tasks | Move all partial tasks from "TaskCurrentPeriod" to "TasksAllocated". |
| 10 | Order Tasks | Sort tasks in TasksAllocated based on ranking. |
| 11 | Iterate Thru Tasks | Establish a loop to iterate through all tasks in TasksAllocated one at a time. |
| 12 | Iterate Thru Labor Categories | Establish a loop to iterate through the labor categories of this low-level task. |
| 13 | Staff Supporting Labor Category | If available staff for this labor category not yet available, establish it. |
| 14 | Build Staff Supporting this Labor Category | Create a table of project team members supporting this labor category. |
| 15 | Special Assignment Conditions | If no special assignments, then assign most productive resource to this task that can complete the job. |
| 16 | Most Productive | Assign most productive labor resource for this task's labor category. |
| 17 | Preferred Project Staff Member Available | See if preferred staff member supporting this labor category, use preferred member. |
| 18 | Assign Preferred Project Staff Member | Assign preferred staff member supporting this labor category. |
| 19 | Rejected Project Staff Member Available | Do not assign rejected staff member for this project, if not available, assign most productive. |
| 20 | Assign Non-Rejected Staff Member | Assign most productive non-rejected staff member. |

FIG. 5G-2

| MEMBER NAME | DATA TYPE | DESCRIPTION |
|---|---|---|
| Hours Available | List | The hours this individual has for each day through the allocation period for this category. |
| Labor Category Pointer | Link | Pointer to designated labor category. |
| Personnel Pointer | Link | Pointer to user's attributes. |
| Productivity Factor | Fraction | How productive this person has been for the tasks assigned to him/her for this labor category. |

FIG. 6B

| MEMBER NAME | DATA TYPE | DESCRIPTION |
|---|---|---|
| Average Salary | Cost | Average hourly salary for labor category. |
| Highest Salary | Cost | Highest salary for Project Team Member using labor category. |
| Hours Estimated | Number | Number generic hours estimated for completed tasks to date. |
| Hours Expended | Number | The number hours expended this year for this labor category. |
| Lowest Hourly Salary | Cost | Lowest salary for any Project Team Member using this labor category. |
| Name | Link | Pointer to name of the category in the character string. |
| Users | Number | The number of users in this labor category. |

FIG. 6C

| MEMBER NAME | DATA TYPE | DESCRIPTION |
|---|---|---|
| Assigned Person | Link | Project Team Member assigned to the task. This is a pointer to the Personnel database. |
| Estimated Hours | Number | Number hours estimated for the completion of this task for the person assigned to the task. |
| Expended Hours | Number | Hours expended for this assigned person on the task. |
| Labor Category | Link | Pointer to designated labor category. |
| Percentage Complete | Percentage | Percentage complete for this task by this person. |
| Percentage Work | Percentage | The percentage of his/her time this labor resource will work on this task. |
| Remaining Hours | Number | The estimated hours remaining to complete this task. |

FIG. 6D

| MEMBER NAME | DATA TYPE | DESCRIPTION |
|---|---|---|
| Adj | Indicator | Indicator for presence of adjective in requirement description. |
| Adv | Indicator | Indicator for presence of adverb in requirement description. |
| Bullets | Indicator | Indicator for presence of bullets in requirement description. |
| Cmp | Indicator | Indicates presence of compound in requirement description. |
| Con | Indicator | Indicator for conjunction in requirement description. |
| List | Indicator | Indicator for presence of list in requirement description. |
| Project | Link | Pointer to project for requirement with issue. |
| Requirement | Link | Pointer to requirement with issue. |
| Shall | Indicator | Indicator for lack of presence of the work "Shall" in the requirement description. |

FIG. 8B

| MEMBER NAME | DATA TYPE | DESCRIPTION |
|---|---|---|
| DM | Indicator | Dependency missing from low level task indicator. |
| DS | Indicator | Dependency superfluous indicator (non-low-level task). |
| HR | Indicator | Maximum task hours exceeded. |
| MD | Indicator | Maximum words in description exceeded indicator. |
| Project | Link | Pointer to project for schedule task with issue. |
| RM | Indicator | Resource missing indicator. |
| RS | Indicator | Superfluous resource indicator. |
| Schedule | Link | Pointer to schedule task with issue. |
| VS | Indicator | Verb not at start indicator. |

FIG. 8C

LABOR RESOURCE UTILIZATION METHOD AND APPARATUS

BACKGROUND OF THE INVENTION

1. Field of the Invention

The invention relates to managing projects, and more specifically to managing labor resources for multiple concurrent projects using a computer.

2. Description of the Related Art

Project Managers seek to deliver new or enhanced products/services to customers while maintaining a careful balance between cost, features, quality, and schedule of the associated project. Project Managers must complete deliverables on time and within budget for their corporation to realize a substantial profit.

Project Managers use scheduling tools for sequencing the activities of their project staff. Various manufacturers have developed project scheduling tools. However, the use of currently available scheduling tools has only moderately improved the success of such projects for a variety of reasons.

Unsuccessful projects fail to deliver the expected return-on-investment envisioned at the time of projected funding. For example, if a project delivery date is missed, the project may require funding above the initial approved amount.

The project management industry continuously measures and publishes information summarizing the percentage of successful projects being delivered on time, within budget, and fulfilling all requirements. For example, a project is considered a success when it is delivered on time, within the original budget, while satisfying all specified requirements. According to ongoing industry measures, less than 40 percent of the projects are considered successful.

Today, various factors influence the timely completion of delivery of project deliverables. Impediments can include complexities that may result from incorporating engineering change orders and modifications to the original project specification, such as the rewriting of an ambiguous requirement. Current project management tools lack the ability to handle multiple project deliverable items over multiple projects, as well as the associated development activities, costs, and resources required. Complexities arise when Project Managers try to measure efficiency, productivity, and skill for each individual. The inability to trace progress during the product development life cycle can impede accurate, effective, and timely project communications for information sharing across team members.

Complexities arise when a project or parallel projects require changes in labor resource assignments for a scheduled task during the course of multiple concurrent projects. Project schedules identify the needed labor resource(s), and then wait for the labor resource to complete their currently assigned task(s), return from a vacation, or recover from an illness. The inability to assign and acquire labor resources dynamically on a daily (or other periodic) basis as the resource availability changes presents a significant industry challenge.

Today, most corporate organizations create and maintain requirements for their individual projects in an outline form. Such tools provide linkage between the requirements, use cases, and test cases, in a fairly comprehensive manner. However, current tools lack analysis capabilities, necessary for ensuring quality requirements are produced and disseminated. Complexities may arise when Project Team Members formulate a differing interpretation or assign a different significance to a project requirement and when deliverable item requirements are added, deleted, or modified without notifying project management team members.

Organizations have a need to assign and allocate labor resources for concurrent synchronized projects according to factors such as task complexity and labor resource expertise presently faced, rather than historically encountered.

In light of the above, it would be desirable to have a project management tool that improves an organization's enterprise-wide labor resource allocation over their project portfolio.

BRIEF DESCRIPTION OF THE DRAWINGS

For a more complete understanding of the present disclosure, reference is now made to the following figures, wherein like reference numbers refer to similar items throughout the figures:

FIG. 4B illustrates an exemplary project score database structure containing an entry for each criterion;

FIG. 4C shows an exemplary rendering for a web page-view criteria listings screen in accordance with one embodiment for the present design;

FIG. 4D illustrates an exemplary page-view criterion scoring screen for rendering with a client browser;

FIG. 6B illustrates an exemplary personnel database structure for use in assigning available staff, ranked in productivity order, within each labor category;

FIG. 6C illustrates an exemplary labor category database structure for use in allocating labor resources to tasks;

FIG. 6D illustrates an exemplary resource database structure for each task's relevant labor resources information for this allocation period;

FIG. 8B illustrates an exemplary requirements analysis database structure for use in examining requirement data quality; and FIG. 8C illustrates an exemplary schedules analysis database structure for use in examining scheduled tasks data quality.

Figure 1A:
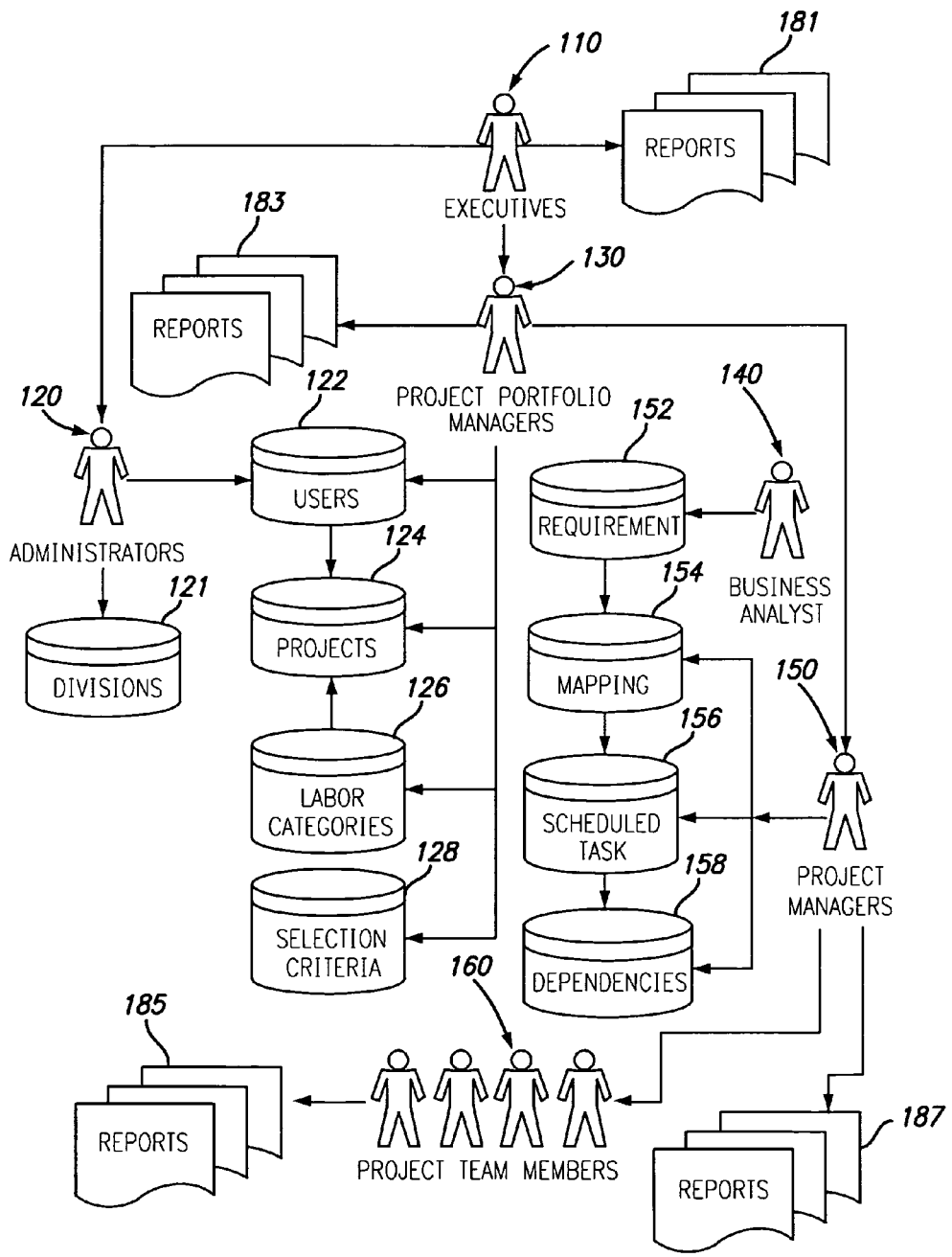
FIG. 1A is a logical representation for users and data, and stored information accessible for each user role, in accordance with an embodiment of the present design.

The exemplification set out herein illustrates particular embodiments, and such exemplification is not intended to be construed as limiting in any manner.

DETAILED DESCRIPTION OF THE DISCLOSURE

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

The present design provides a set of automated tools for allocating an organization's labor resources during the life of a project. The automated tools may be configured for simultaneous synchronous ordering of approved tasks sourced from multiple concurrent projects grouped into multiple parallel portfolios. The tools may facilitate information collection for multiple projects, and operate on the information collected based on fixed criteria, predefined algorithms, and composite data analysis, i.e. intra-project and inter-project dependencies and relationships.

Of particular note in the present design are the following features. The present design improves the way projects are selected in that multiple factors are evaluated, and the most important projects are ranked in order of importance to the organization and labor resources are optimally allocated on a desired schedule, such as on a daily basis. Second, requirements are evaluated and issues with requirements are identified and key project personnel are notified. As an example, certain requirements may include various adjectives or other words that make the requirement ambiguous, or too complex, causing problems effecting delivering a successful project. Once ambiguities are removed, requirements may be approved to support a common understanding of what is to be accomplished and how it will be verified. A third attribute is the ability to track productivity and improve return on investment (ROI) by understanding and applying resource information. As an example, one labor resource may be paid at a rate of $50 per hour where the average salary for the labor category the individual supports is $100 per hour. If the individual's productivity for the labor category is 1.2, then theoretically the organization would accurately pay the individual $120 per hour, whereas if the individual's productivity is 0.4, the organization would accurately pay the individual $40 per hour. This provides management a scientific method for evaluating performance and appropriately rewarding the staff.

A further attribute of the present design is the ability to cost projects accurately. Projects are broken into requirements, and each requirement is linked to one or more project schedule tasks necessary to implement the requirement. Low level requirements (requirements without any sub-requirements) can be linked to low level project schedule tasks, and such linking enables accurate costing of projects.

In general, the present design provides enhanced labor resource allocation for managing labor resource utilization. The system provides facilities and modules for executing the resource allocation algorithms and functions. The processing and execution environment maps each project requirement to a set of tasks.

Users of the present design typically employ a computing device, for example a laptop, smart phone, or a notebook with a network connection, such as a connection via the internet, from an available Wi-Fi signal, cellular, and fixed cable. Other computing devices, such as a desktop or other known device may be employed.

The system may execute a set of allocation algorithms and processes arranged for generating ranking and scoring data for newly proposed projects. The system generated data relates task assignments to available labor resources during a project's life-cycle from definition and funding, development, productive use deployment, and maintenance.

The present design provides for automated responses, such as triggering events when a particular metric is out of range, such as a schedule delay, and presents the appropriate individuals with information based on the events causing the trigger to be set.

The input to and outputs from the system may be stored for use by a reporting mechanism for collecting and presenting project information. Information may be communicated and disseminated over the Internet. The supporting computer network may employ an encrypted connection and secure operational environment.

The users may store project data in the system for processing and retrieval, whereupon certain additional information may be solicited by the system for updating. In one scenario, a customer requests for a change in project scope. The customer change request is received by the Project Manager for consideration. The Project Manager, Business Analyst, or other appropriate person enters schedule and requirement modifications into the system representing the change request. Appropriate team members may modify scheduled tasks impacted from mappings to the new and modified requirements. The task impacts typically involve assessing and entering resources available and necessary to develop the features and functions introduced from the modified scope.

The system allocation algorithms, modules, and processes provide for generating a new project baseline for each project affected by the change. The processing includes functions and modules for calculating and determining the effects resulting from accepting the change request, such as recalculating the total project cost and updating the critical path, where critical path represents the path to completion of the project and is understood by those skilled in the art. The allocation system processing and reporting facilities may determine and indicate next logical steps, and allocation scenarios, to maximize labor resource utilization and satisfy the critical path needs for multiple projects simultaneously.

The present design thus automates the assignment of available labor resources to prioritized project tasks to enhance resource utilization and reduce time and costs. The automated assignment mechanism is configured for synchronous and simultaneous consideration of labor resource demands from multiple concurrent projects, grouped into multiple portfolios, from the entire set of tasks under an organizations purview.

Previous systems enable an electronic presentation of data for a single project. These designs typically collect, organize and store project requirements. Requirements may be created and modified by various team members without the benefit of automated analysis to ensure that each requirement is written in a clear and concise format and meets corporate best practices. No ability to provide simultaneous and synchronous data analysis exists. Previous systems do not have an ability to broadcast of an event trigger generated from automated scanning and examining of data to identify an ambiguous requirement or compound requirement.

The present design not only automates analysis of intra-project and inter-project data and organizational dependency relationships, e.g. a planned activity is projected to complete on time such that the available individual may be assigned to a task in a different project. The present design enables user review in order to make proper labor allocation and utilization decisions for multiple project activities.

Three fundamental algorithmic modules are presented in the mechanized multi-portfolio multi-project labor resource assignment system and method. The first module assigns labor resources to a prioritized list of project tasks from the entire portfolio of projects with the highest skilled individual for the required labor category. The second module identifies and matches a generic labor category to each scheduled task to generate a current, up to date set of schedules for multiple concurrent projects. The resulting schedule tasks may be assembled to form a prioritized list, accounting for complexity and risk. The third module ranks multiple projects based on assessment criterion evaluation scores and adjusts the prioritized task list order according to project ranking.

The modules of the present design are described below, in some cases at an architectural level and in others at a logical level. The processing described below may be performed by a single platform or by a distributed processing computer platform. In addition, such processing and functionality can be implemented in the form of special purpose hardware or in the form of software or firmware being run by a general purpose or microprogrammed computer or computing device. Data handled in such processing or created as a result of such processing can be stored in any type of memory as is conventional in the art. By way of example, such data may be stored in a temporary memory, such as in the RAM of a given computer system or subsystem. In addition, or in the alternative, such data may be stored in longer term storage devices, such as FLASH memory, magnetic disks, optical disks, and so on. For purposes of the disclosure herein, a computer-readable media may comprise any form of data storage mechanism, including existing memory technologies as well as hardware or circuit representations of such structures and of such data.

The methods described herein may be implemented in software running on a programmable microprocessor, or implemented in hardware utilizing either a combination of microprocessors or other specially designed application specific integrated circuits, programmable logic devices, or various combinations thereof. The methods described herein may be implemented by a series of computer-executable instructions residing on a storage medium such as a disk drive, or other computer-readable medium.

Further, while primarily described herein with respect to an exemplary system and method for automated resource allocation techniques in a software product development scenario, the invention and disclosure herein are not intended to be so limited. As noted, the present design may be employed in a variety of scenarios, further including but not limited to projects for information technology, engineering, construction, research projects, and projects where it is desirable to assign labor resources to tasks for maximizing resource utilization.

As used herein, the term "portfolio" refers to managing the relationship and inter-dependencies for a set of current and proposed projects to satisfy established corporate return-on-investment goals and for realizing cost, schedule, and quality measure improvements for project groups. The term "project" refers to the series of activities, efforts, and tasks involved in designing and developing a business or consumer product or service in response to an approved and funded corporate business case.

The system may be operated on the Internet, as a web enabled client-server based computing platform. A client application, such as a web browser, may allow for users to input project data and produce reports by processing the inputted data at any time, i.e. a snapshot, across an entire organizations portfolio.

The system may be built as a web accessible application that is database driven. Access may include using current internet browser designs, such as Microsoft's Internet Explorer, Google's Chrome, and Mozilla's Firefox. The software application algorithms and functionality may be built using XML compliant database environments such as Oracle's MySQL, IBM's Database 2, and Microsoft's Structured Query Language.

The database driven software application may be implemented using the Java programming language in combination with JavaScript, or any other known programming language capable of executing the functionality disclosed herein, such as the "C" programming language, and may execute in a corporate or external secure data center and may be enabled as a web based service providing the technology foundation for managing the successful delivery of multiple simultaneous projects.

The present design may be deployed using a client-server based, cloud-based, or internet-based architecture. Databases typically reside on a server, and multiple users may access, enter or modify the project information depending on their organizational role and administrative access rights. The users interact with the internet browser, and the internet browser may include hardware and operating system, intra-operating with the database objects. The users of the system, typically a Project Manager, Business Analyst and/or a Project Portfolio Manager, may input a request for a specific or custom report dynamically update, e.g. create, delete, and/or modify currently active project requirements, schedules, options, and event triggers to assure the organization's projects are delivered within cost, delivered on time, with high quality, completed project requirements.

The system typically performs end-of-day processing. End-of-day processing includes daily (or other periodic) automated decision supporting analysis tasks regarding multiple portfolio project requirements and schedules. End-of-day processing ensures project information entries and modifications are consistent on a periodic (e.g. daily) basis. Users can mitigate potential project issues impact by finding out what issues exist on a periodic/daily basis. This enables Project Portfolio Managers, Business Analysts and Project Managers to expeditiously resolve these issues to assure that each project's cost, schedule, and quality are consistent with project goals.

Modules

FIG. 1A presents a logical representation for user roles, data, and high level interactions and relationships for retrieving and storing data in accordance with one embodiment for the present design. Users may input data for storage in the system, available for use in processing, such as for generating a project ranking report and disseminating the report to predetermined corporate individuals. Modules for effectuating the allocation algorithms and data associations are illustrated in FIGS. 3A-3E.

Figure 2:
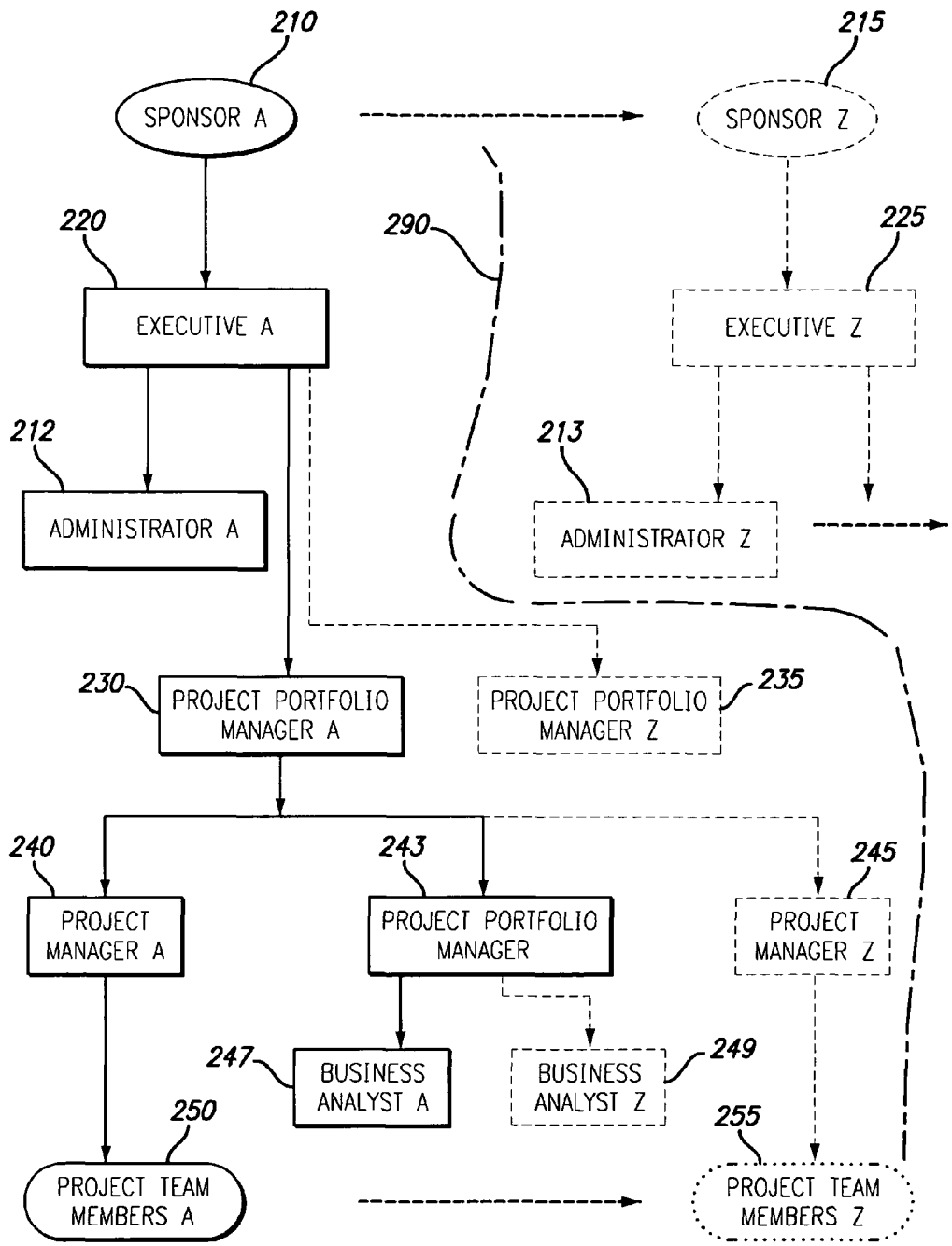
FIG. 2 illustrates a hierarchal structure for defining the relationships between each user role that in accordance with one embodiment of the present design.

Initial user roles and corporate hierarchal structure relationships will be discussed to form a foundation and to elaborate on some basic application design concepts. FIG. 1A and FIG. 2 illustrate the roles for and relationships between each of eight member types.

From FIG. 1A, corporate team members including Executives, Project Portfolio Managers, Business Analysts, Project Managers, Administrators, and Project Team Members, may access and interact with the system in performing their daily corporate roles and responsibilities.

For example, the corporate members illustrated in FIG. 1A may become involved as necessary to fulfill various portfolio and project organizational duties such as managing the implementation activities for multiple concurrent projects. Duties may involve creating requirements and schedules, estimating total project cost, allocating resources, managing changes in project scope, and measuring project metrics for evaluating overall performance.

In one embodiment, the present design may define eight different member types, including an Executive, Project Portfolio Manager, Administrator, Business Analyst, Project Manager, Business Analyst and Project Team Member, can access the system. A project Sponsor may receive communications generated from the system, for example when a critical metric falls outside of a preset range. A user may fulfill multiple user roles within the system. For example, some organizations may have one individual performing the activities, duties and responsibilities for the Project Manager in parallel with the Business Analyst roles. The current design may enable creation of additional user types as needed. An authorized user may, for example, designate a Supervisor role, and each project may designate a Sponsor role.

Referring to FIG. 1A, the primary responsibilities for an Executive 110, may include activities for viewing, critiquing, and mentoring their Administrators 120 and Project Portfolio Managers 130. Executives are also responsible for adjusting salaries of all users. Executives may use the system to obtain a variety of reports, for viewing cost and schedule data to ensure the organization's projects remain within budget, on schedule, and meet or exceed all requirements. For example, an Executive may review project costs and schedules to help improve key decisions regarding budgets. Additional Executive activities may include approving employee leave requests and reviewing the organization's salary structure for various labor and skill categories such as hourly wages paid.

The primary responsibility for an Administrator 120 may be establishing and maintaining the system environment. A Project Portfolio Manager 130 may use the system to add, delete, or modify information pertaining to divisions within an organization and users in the personnel database 121. An Administrator may create and store the initial fields required for starting a project in users database 122 and project database 124.

An exemplary personnel database structure illustrated in FIG. 1B represents each individual Project Team Member, with a data type and description for each member. The element may contain a team member's relevant information, for all members of the organization who perform tasks or are stakeholders.

The Division database 121 may contain the division name for each permanent site where work is conducted for the organization. For example, information regarding the location where the team member primarily works, and the number of personnel assigned to this location, as well as the monetary unit and its exchange rate relative to the US dollar which may be automatically updated periodically (such as daily).

The primary responsibility for a Project Portfolio Manager 130 may be reviewing and approving requirements and schedules created and maintained by supporting Business Analysts 140 and Project Managers 150. Project Portfolio Managers also mentor the Project Managers and Business Analysts working on the projects assigned to the Project Portfolio Manager. Project Portfolio Managers may access and use automated processing of project information stored in users database 122, project database 124, labor category database 126, and project selection criteria database 128, to generate an ordered ranking of a project from a set of projects under their purview. An exemplary criterion weighting table, in accordance with one embodiment of the present design, is illustrated in FIG. 1C. Selection criteria database 128 may contain the name of each project evaluation criterion, identify the data type for each database entry, such as a link or numerical value, and relate descriptive information regarding each criterion.

In addition, a Project Portfolio Manager may review and approve changes in requirements, schedules, and manage labor categories stored in the databases illustrated in FIG. 1A. The Project Portfolio Manager 130 may examine various quality measures, such as individual staff productivity and resource utilization values generated by the system. In addition to their primary responsibilities, a Project Portfolio Manager 130 may perform other duties such as shown in a table such as is illustrated in FIG. 1D, which lists Project Portfolio Manager roles. The table, illustrated in FIG. 1D, relates a specific activity and a time span or event for performing the activity. In the FIG. 1D example, the relationship between roles, activities, and schedule are provided.

The primary responsibility for a Project Manager 150 is ensuring project success by managing and monitoring Project Team Member performance. A Project Manager may access and use the system to measure and manage scheduled activities and deliverable milestones. A Project Manager may retrieve information from requirement database 152, mapping database 154, schedule task database 156, and dependency database 158 and user database 122 as illustrated in FIG. 1A. Information retrieval may include standard, i.e. predefined, paper and electronic reports relating project details as well as actual measures versus planned tasks. The Project Manager 150 may manage the scheduled activities and define tasks dependencies. The Project Manager role may include responsibility for modifying project tasks, reporting project's task attributes such as percentage of task completed, monitoring progress for assigned tasks, and monitoring team member performance.

Project tracking and reporting facilities may enable Project Managers to ensure requirements are mapped to schedule tasks. The user input data stored as well as system generated data, or processed data, may be retrieved and rendered or reviewed by Project Managers. The Project Manager 150 may input scheduled task attributes, for example, inputting a numerical value for each task based on measured progress to indicate the amount, or percentage, of progress completed against or relative to task completion. An exemplary chart, illustrated in FIG. 1E, provides a list for the major database structures. The list may relate a specific database structure and provide a description for each structure listed.

A Business Analyst 140 Business Analyst creates and maintains project requirements. The creation and maintenance of project requirements may involve collecting and documenting project requirements solicited from customers, stakeholders, key developers, and test engineers, and the like. The Business Analyst may use the system to add, delete, or modify information pertaining to a project's requirements. For example, updates to a requirement specification and/or operations concept use case description, whereby the analyst may input updates for storage and retrieval from requirement database 152. The Business Analyst may work with the Project Manager to create the mapping database 154 entries for establishing links and relationships between from requirements to scheduled tasks.

Project Team Members 160 do not have any major responsibilities with respect to the system. The Project Team Member class of user defined within the system may enable mechanized assignment and allocation for generic labor categories or specific labor resources to tasks during the allocation period. The team members may access the resource allocation system to maintain their personal attributes whenever a change occurs, such as updating a change in email address, phone number, cell number, and the like. Information flow displayed on the home page may provide each Project Team Member his/her task assignments on a daily basis and supports their performing their assigned project tasks on time. Team members may be provided access to the system and may request current project information to view particulars of their responsibilities.

Members may have access rights, authorization privileges, and permissions determined by their user types.

A project Sponsor may include a stakeholder responsible for the overall project requirements and timely completion of deliverable and milestone tasks. Such an individual may receive messages from the system. A Sponsor is not typically a system member type supported in the personnel database. In this arrangement, the Project Portfolio Manager is able to assign access rights for a project Sponsor. The system may notify the project Sponsor in the case of critical events that might affect the project's schedule, cost, scope or quality.

The system may monitor project data, based on a set of predefined metrics, to detect and indicate when data values fall outside of the desired range. Event processing may involve detecting, generating, and transmitting information regarding the occurrence. The information may contain descriptive details for the event and transmitting may distribute the information to designated team members and may include a Sponsor. For example, a Sponsor may want to be notified by either email or the system's internal notification of messages and tasks on their Home page for receipt of event descriptive details. The system database may store elements containing the Sponsor's desired contact method and contact information, without the need for creating a system user type for this organizational role.

The present design may involve a "request-for-report" mechanism for users to obtain information necessary to ensure project deliverables are on time and within the originally established budget. The present design may provide for a reporting facility configured to generate information based on a user submitting a request. A report database may contain an entry for each customized report. The system may provide specific reports for the disclosed corporate user types at points 181, 183, 185, and point 187 as shown in FIG. 1A. An exemplary report database structure for use in accordance with the present design is illustrated in FIG. 1F.

FIG. 2 illustrates an exemplary organizational hierarchy and indicates the interrelationships, divisions of work activities, and levels for each user type. The hierarchal structure is formed by relating management authority and responsibility using a line organization structure. In one embodiment, the system may arrange the organizational roles in a hierarchal structure and configure intra-role relationships to manage multiple concurrent projects, as illustrated in FIG. 2. Organizationally, Sponsor A 210 primarily works with Executive A 220, and potentially multiple Project Portfolio Managers, illustrated as Project Portfolio Manager A 230 through Project Portfolio Manager Z 235. Executive A 220 management of multiple Project Portfolio Managers may typically include manage Administrator A 212. Following the hierarchal structure, Project Portfolio Manager A 230 may manage multiple Project Managers including Project Manager A 240 through Project Manager Z 235. Project Portfolio Managers may assign each project a dedicated Project Manager for managing, measuring, and/or reporting. In certain situations, a Project Manager may have responsibility for multiple projects.

Project Portfolio Manager A 230 may manage Business Analyst A 243, or may manage multiple managing Business Analysts, not shown in FIG. 2, as well as manage Project Managers.

In one embodiment, the Business Analyst position is not staffed. Each Project Portfolio Manager may manage multiple Business Analysts. The Project Portfolio Manager may assign each active project a dedicated Business Analyst. In certain situations, a Business Analyst may have responsibility for multiple projects. the project duration, project complexity, and/or size of the business or project may dictate the combination of these two roles.

Continuing down the exemplary structure, Project Manager A 240, may assign scheduled tasks to Project Team Member A 250, and in a similar manner, Project Manager Z 245 may assign scheduled tasks to Project Team Member Z 255.

The numbering system used in FIG. 2 indicates an arrangement of items from A through Z, however the number of items may be greater or less than Z, and may be determined based on the size of the organization, etc. A dashed line is shown in FIG. 2 at point 290, to indicate that the hierarchal structure shown to the left of the line may be replicated on the right side of the line as many times as required for an organization.

The numbering system used in FIG. 2 indicates an exemplary arrangement for replicating users as need by the organizations projects, labeled from A through Z. The actual number of replicated roles created may be determined based on the size of the organization. However the number of roles may be greater or less than Z; certain roles may not be filled, such as the Business Analyst. In some instances the combination of Business Analyst (BA) and Project Manager (PM) roles may be assigned to the same individual.

Smaller organizations may choose to assign a user role to a Project Portfolio Manager, a single PM combined with a BA, and the like, to build a hierarchal structure as illustrated in FIG. 2. Dashed line 290 is shown to indicate the hierarchal structure, from Sponsor through team members. The elements and roles shown to the left of the dashed line may be replicated on the right side of the dashed line as many times as desired.

Select users may be authorized, typically by the Administrator, to designate a Supervisor category, not shown in FIG. 2. The supervisory role is not a user type, similar to the Sponsor designation. Team members are typically assigned a Supervisor. The Supervisor may provide a communication point for receiving notifications generated when an event or trigger occurs. The Supervisor may ensure the proper team members receive and act on each notification.

The system Project Team Member role generally does not have major responsibilities. Project Team Members report to their respective Project Managers for tasks assignments, and report their progress via the Home Page workflow. In general, members are responsible for updating stored personal attributes when a change occurs, such as a newly created email address or phone number. The purpose of configuring a Project Team Member user role, or type, is to enable the system to identify and mark available qualified individuals for automated task assignment during the allocation period.

The fundamental design concept involves assigning organizations available staff members, for allocating labor resources, to tasks sourced from multiple projects. More specifically, the concept involves an allocation algorithm configured to assign the most productive staff member first, for the needed labor category, to the most important task. The allocation algorithm configuration may consider additional staff member factors in combination with productivity, such as existing project task experience, existing project experience, client requests for specific resources, previous level of responsibility, and skill performing similar tasks. The allocation processing modules may execute algorithms, modify database entries, and invoke processes to realize the desired optimized allocation results. The system may generate allocations at the end of each business day, typically for a period between two weeks and ten weeks, or a different amount of elapsed time for defining the allocation period.

The present design may generate a project schedule where a Project Manager assigns all low-level project tasks to generic labor resources using predefined labor categories instead of actual individual staff members. When a project task becomes ready for execution, during the allocation period, the allocation algorithm may assign an actual available staff member responsible for the implementation of the scheduled project's task. The design is not limited to a set, or fixed, number of organizational labor categories. Example labor categories may include software architect, software engineer, level-one programmer, level two-programmer, test engineer, configuration and release engineer, contractor, electrician, and so forth. Each labor category within the team member role structure may include as many levels of division as needed. Each Project Team Member is assigned to one or more generic labor categories. The assignment processing may include previously demonstrated skills and consider total compensation, such as an hourly labor rate or a salary with employee benefits.

An average hourly salary for each labor category may be computed by the system and continuously updated. In general, the present design may determine an average hourly compensation, or wage, for each labor category, including default generic and custom built categories. Updating may also involve automated scanning of active project tasks to identify completed tasks, or make a measurement indicating percent completed. The system may accumulate completed task information and modify an internal value to reflect the exclusion of the tasks marked as complete.

The average hourly salary algorithm may implement the formula shown below:

$$AHS_i = (\Sigma(MHE_i) * (CHR_i))/THE_i \quad (1)$$

From Equation (1), the allocation algorithm may calculate the organization's average hourly compensation, or AHS. AHS calculation may involve summing values obtained from multiplying each team member hours expended (MHE) by their assigned labor category hourly rate (CHR) and dividing the resulting summation of values by the total hours expended (THE) by members in the labor category. In one arrangement, the system may accumulate AHS for team members for a predetermined time period, such as over the course one year.

For example, Member one expends 1000 hours and is compensated one-hundred dollars ($100.00) per hour. A second employee, Member two, works 200 hours and is compensated five-hundred dollars ($500.00) per hour. Applying these values to the AHS, Equation (1) yields:

$$AHS = ((1000*100) + (200*500))/(1000+200)$$
$$= (100000 + 100000)/1200$$
$$= \$166.67$$

In comparison, previous design formulas for calculating AHS typically are based on equations similar to, or the same, as Equation (2), where:

$$AHS = (\Sigma(members\ salaries))/\Sigma(members) \quad (2)$$

Applying the example values presented above to the previous equation yields:

$$AHS = (100+500)/(1+1) = \$300.00$$

The AHS value of Equation may be used to estimate project cost and may provide for quality metrics based on the calculated cost effectiveness for each team member.

Allocation System

The present design is a database driven web based application, where the application modules, algorithms, and functions are organized around project database objects, such as those illustrated in FIGS. 3A-3E. The server housed application can be accessed using any popular Internet browser client application. Multiple users may interact with the present design's server arrangement concurrently. Users may view, and update, e.g. add, modify and delete, stored data depending on access rights granted. For example, the Business Analyst or Project Portfolio Manager may modify the requirements and may request reports. The Project Manager or Project Portfolio Manager may modify the schedule and may request reports.

Efficient automated assigning of resources, in accordance with the present design, may enable organizations to maximize labor utilization rates. Maximizing utilization rates, realized from operating the present designs software, may allow for organizations to achieve a significantly higher rate of return from an initial project funding investment.

The present design may provide for a re-active software tool set, in an arrangement configured for responding to user requests by accessing or generating the desired information, or by manipulating, e.g. adding, modifying or deleting, data for updating the stored project contents. The system may be configured to provide for automated end-of-business day (EOB) processing. One example of EOB processing is the automated analyzing of project's requirements and scheduled tasks for ensuring project data quality. In another example, EOB processing provides automated reporting of previously scanned and examined project's data to identify potential issues that may impact project cost, schedule, or the quality of deliverable materials.

FIGS. 3A-3E illustrate a logical architecture for configuring a set of modules configured to interact with content stored in the database. The modules and database application execute from within the server. Some or all logical modules and database objects could, for example, be distributed across multiple servers.

Figure 3A:
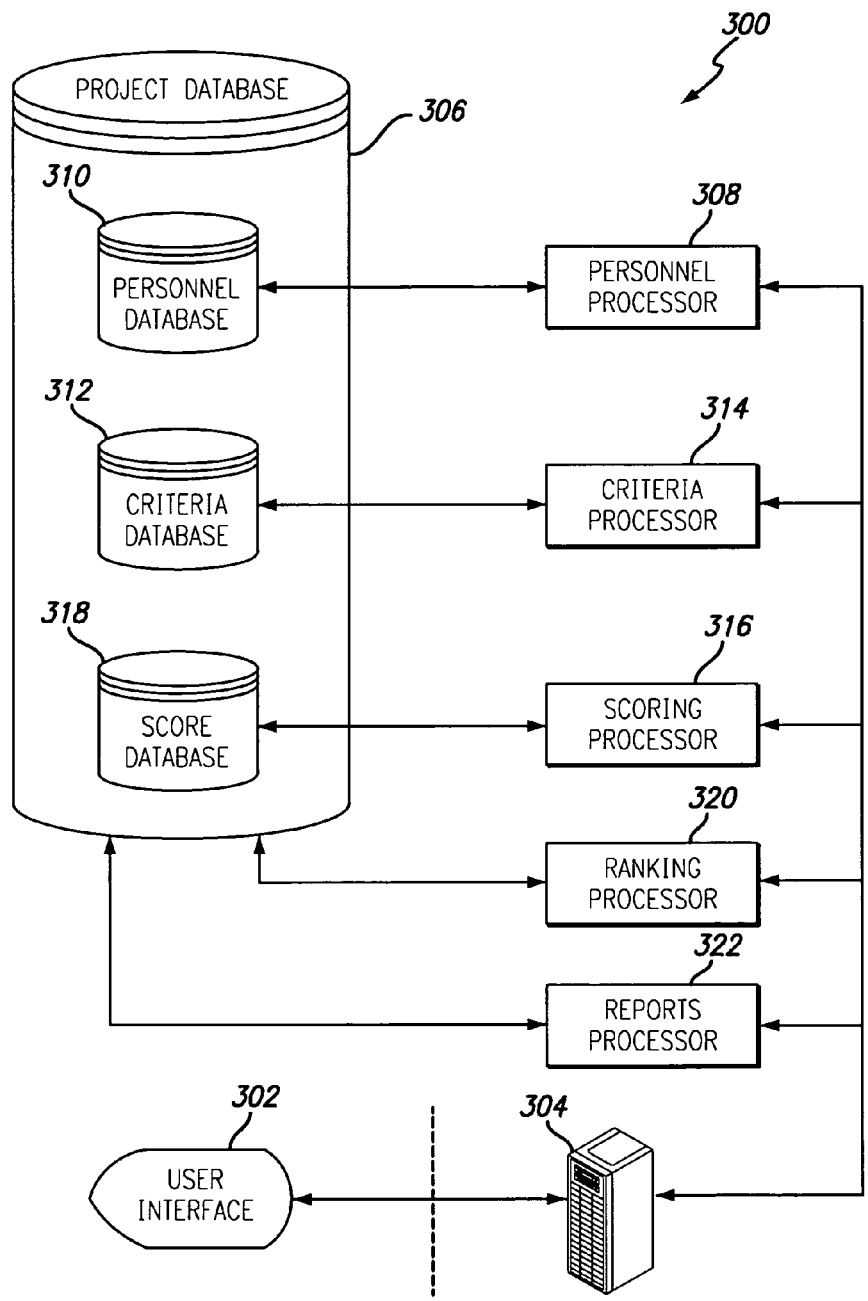
FIG. 3A is a logical architectural representation for the software modules and databases involved in realizing the automated ranking method.
Figure 3B:
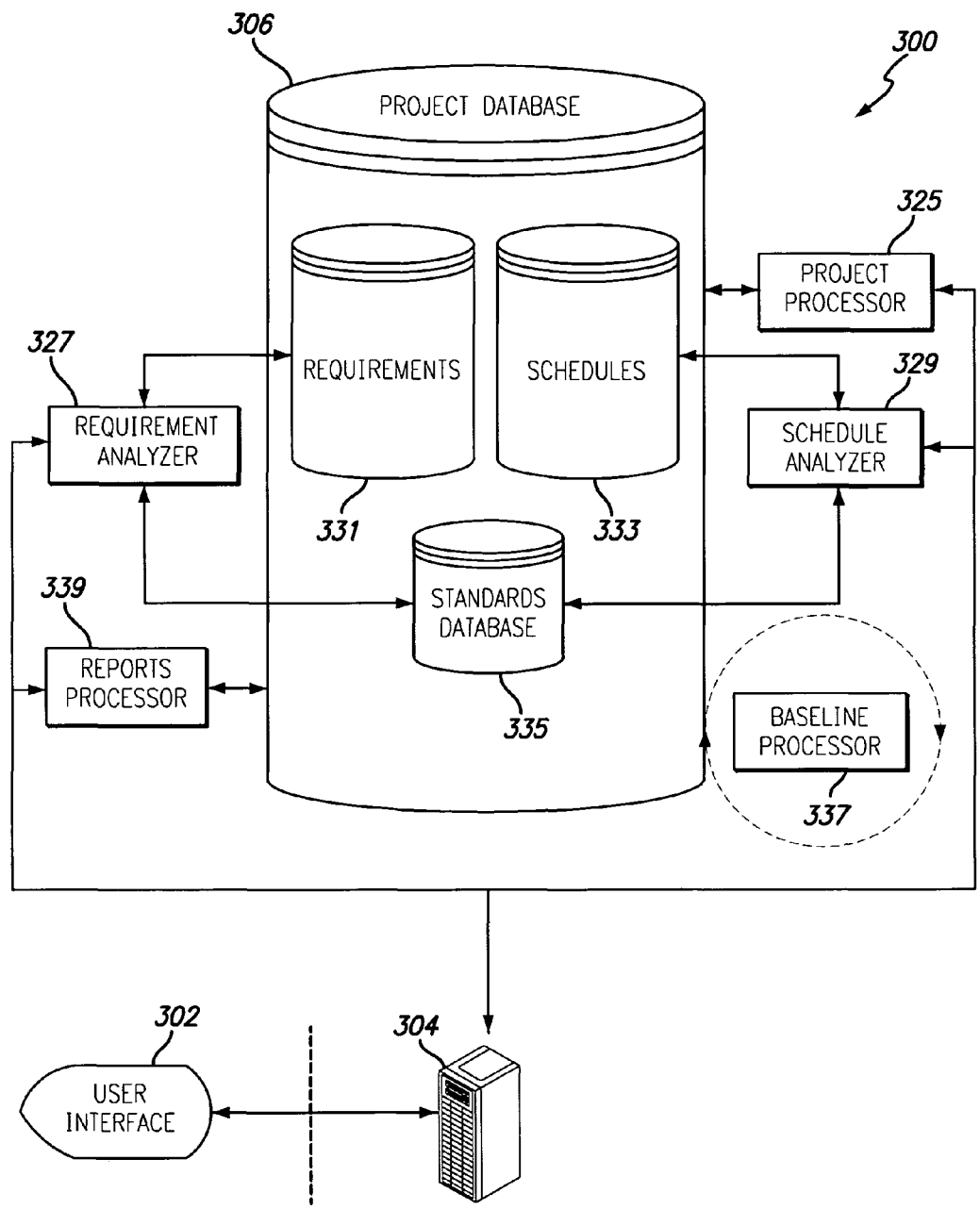
FIG. 3B is a logical architectural representation for the software modules and databases involved in realizing the baseline.
Figure 3C:
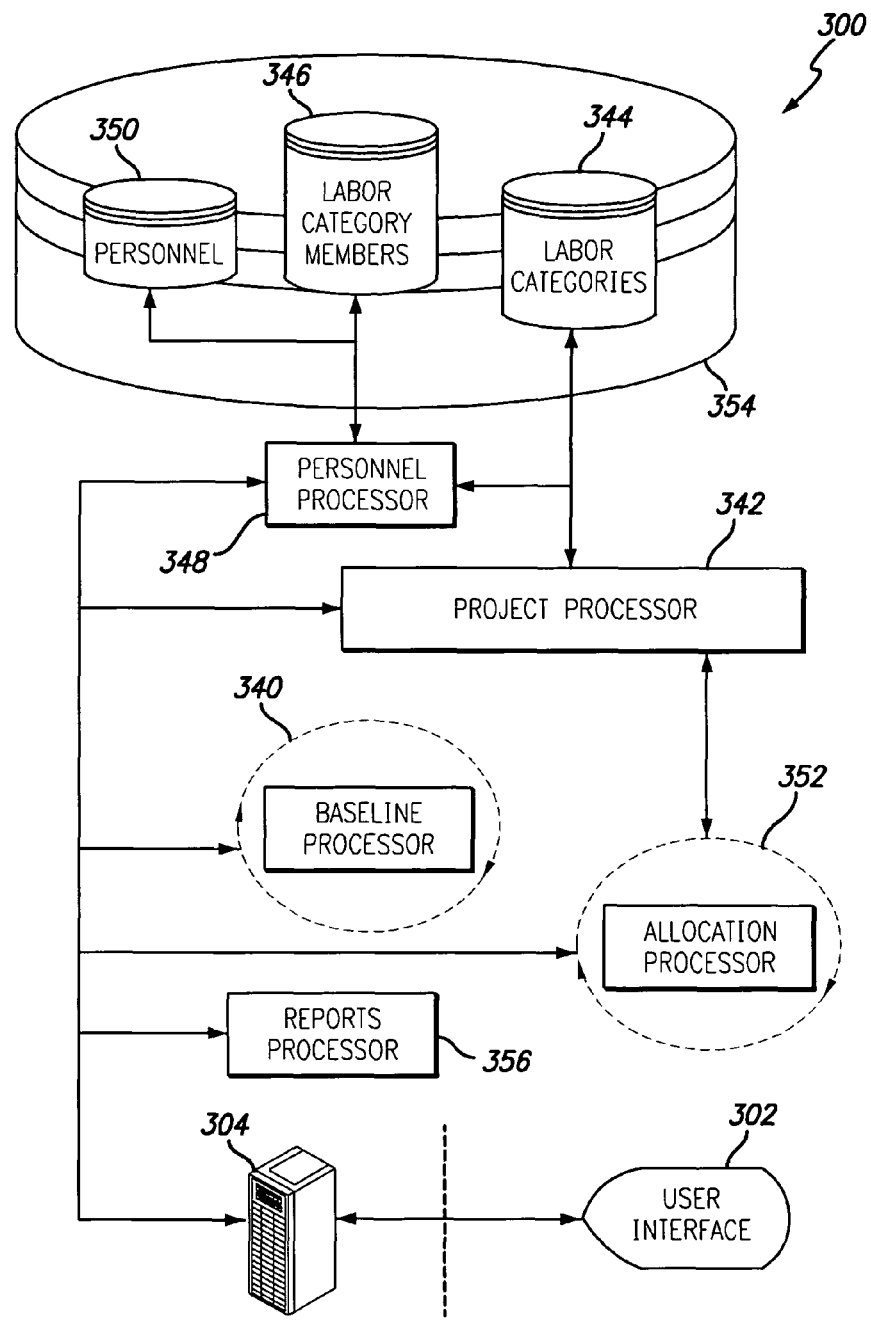
FIG. 3C is a logical architectural representation for the software modules and databases involved in realizing the resource allocation method.

Architecture 300 in FIG. 3C may provide for storing data from users performing the hierarchal roles illustrated in FIG. 2. In FIGS. 3A-3E, each process may involve executing similar operations for user/system interaction functions, such as accessing and modifying data, requesting project reports, and like operational procedures, initiated from a graphical user interface. The graphical user interface may enable rendering of page views generated by the system. The server may enable access to project content stored in the project database.

FIG. 3A is a logical architectural representation for the modules and database entities involved in implementing the present system. Authorized users may access the system via user interface 302 and enter profiles for individual staff members. Profile data entered, for example initially populated personnel database 310, may be formatted, parsed, named, routed and stored. Profile updates may be entered for individuals joining or leaving the organization's business. Personnel processor 308 may provide the user experience and page-views, executing in server 304, rendering pages for presentation and viewing via user interface 302. For example, a page-view may be built to solicit profile data for entry by the system users.

Each individual staff member profile may include, but is not limited to, personnel identification information such as name, email address, telephone number, job title, user types, labor categories, productivity per labor category and the like. Server 304 may provide user access, for example to team members assigned to a project. Such team members may have access to, for example, content stored in project database 306.

In FIG. 3A, users may enter evaluation criteria via user interface 302 for storage and retrieval from criteria database 312. A weighting factor may be assigned for each project criteria entered along with the individuals responsible for scoring each criterion for a division's set of projects. Criteria processor 314 may enable entering of project criteria and may employ a default weighting factor.

Scoring processor 316 may process a score for each individual project criterion stored by the designated criterion evaluators. The module configuration may involve a formula for calculating a sum total of the individual scores generated by scoring processor 316 to determine a total project ranking score. Scoring processor 316 may store the total project score in the project's ranking database 318. In the situation where an evaluator modifies criteria, weights, or scores, criteria processor 314 may continuously examine criteria database 312 to identify changes submitted. Scoring processor 316 may provide updates to criteria database 312 for updating scores influenced and impacted by the evaluator's modification(s). In one embodiment, criteria processor 314 may notify and signal scoring processor 316 when a change is identified while examining criteria database 318. Changes to data stored in project database 306 may be entered into the system, for processing and storage, by an evaluator or other authorized team member.

Ranking processor 320 may generate a ranked order for the proposed projects by evaluating the current scoring information stored in project database 306. Order processing may sum each project's evaluator score and modify the summed score value according to a default or custom criteria weighting factor. Ranking processor 320 may determine and place the projects in a rank order, such as highest to lowest. The users may obtain the ranking order by submitting a report request via user interface 302. Report processor 322 may generate a request response and may be configured to retrieve information from project database 306 to satisfy the request. Report processor 322 may format the retrieved information for presentation and may deliver the report via system server 304 for viewing by team members involved in the evaluation process using user interface 302.

The system may therefore generate a new project ordering at the end-of-business each day each time a user modifies a selection criterion evaluator's score. The continuous system operation may provide a current ranking order, accounting for the resulting score changes calculated by scoring processor 316. Simply put, proposed project evaluation algorithm executes the module arrangement continuously for active, immediate response to a dynamically changing set of criteria, criteria weights, and/or scores.

The process flow arrangement may involve concurrent parallel processing for multiple proposed projects under consideration for funding by an organization. For example, concurrent processing may include generating a new score for project '1' in response to changing criterion, and simultaneously assigning staff to tasks from the project '2' and '3' established schedules, in combination with executing a plurality of report requests, such as requesting schedules from each concurrent process.

FIG. 3B is a logical architectural representation for the modules and databases involved in establishing a project schedule. Architecture 300 may establish project schedules for multiple projects. Each project schedule may include but is not limited to details for scheduled milestones, tasks including an assigned generic labor categories, durations, and dependencies. The information contained in the established schedule generated may identify a suite of quality metrics, for measuring and tracking quality, available for use during the development effort or comparing against the present project data. The data processing for realizing project schedules may involve executing analyzer module facilities configured to examine the quality of project requirements and schedules entered into the system. The arrangement may support the examination of data sourced from multiple concurrent proposed and active projects.

Project Managers, Business Analysts, and Project Portfolio Managers may create, modify, and store project content available from architecture 300. Project content may include, but is not limited to, requirements and corresponding schedule data representing a project. Project Managers, Business Analysts, and Project Portfolio Managers may modify and update project content and/or incorporate changes to the project prior to establishing a baseline. As used herein, the term "baseline" represents a point in time and the status of the various components—requirements, schedule, labor, etc.—at that point in time. Server 304 may provide an execution environment to generate sequential project baselines, i.e.

multiple baselines occurring one after another. Modules may communicate, interact, and operate with the database system. Authorized users may access the project database 306 data store facilities. For example, projects processor 325 may enable user interface operations and allow access to multiple projects data stored in the project database. Projects processor 325 may provide features and functions to create a new project. A create project function may allow members to access data and enter a new project name. In one scenario, the Project Portfolio Manager may enter and modify project data, such as the name of the Project Manager, Business Analyst and Sponsor. The projects processor may provide access to modify and update project data operations. Project processor 325 may provide selected team members access to invoke the baseline processing functions. Access to functions may be page-view screens rendered via user interface 302, generated by projects processor 325.

Requirement analyzer 327 may compare each requirement stored in requirements database 331 with recognized industry standards for quality stored in standards database 335. Schedule analyzer 329 may examine schedule item content, such as comparing each schedule item stored in schedule database 333 with known industry standards database 335. Schedule analyzer 329 may operate and execute concurrently with, or independent from, requirement analyzer 327.

The analyzer modules may provide a mechanism for evaluating project contents and information and seeking project attributes that meet or exceed project quality standards. The remaining content is rerouted to the originator to resolve any content issues identified. In the situation where the analyzer modules indicate or 'mark' all project content as accepted, the project data is ready for Project Portfolio Manager approval. In the situation where the project is not approved, the update content processing may repeat in a continuous synchronous cycle until architecture 300 determines no issues remain for the project. In one scenario, the Project Portfolio Manager may approve the project and submit a request to generate a project schedule based on the accepted and approved project data.

In one embodiment, the architecture 300 may determine that a new project baseline needs to be established. Baseline processor 337 may establish baselines for multiple projects, synchronously, in accordance with the architecture illustrated in FIG. 3B. The generated baseline comprises available project requirements and schedules so comparison can be made against previous dates and costs. A baseline may provide a complete project implementation plan defining and depicting project milestones and relevant project deliverables. At the time a baseline is established, baseline processor 337 functions may involve accessing the currently available contents from project database 306, including approved requirements and schedule items. The project plan, milestones and metrics generated from processing approved project content may be stored by the baseline processor in the project database.

Baseline processor 337 may generate and store sequential project baselines for multiple concurrent projects. The resultant baseline quality metrics may indicate incremental measures for determining a project's progress at any point in time and comparisons with past estimates. A new project baseline may be created in response to requirements changes and/or updates to schedule items that may arise during the project development activities. Previously generated baselines may be used as a historical basis for determining project impacts. In one embodiment, the present design may generate a projects baseline based on potential changes entered into the projects database. The baseline processor 337 may simulate and determine impacts resulting from potential changes that may be entered or occurrences that may transpire. For example, the simulation may include determining changes to the project plan tasks existing, or considered, on the critical path.

Users may access and retrieve project data by submitting a report request at user interface 302. Report processor 322 may retrieve information from project database 306 to satisfy the request. Reports processor 339 may render system generated page-views from executing in the system server 304. The report processor may format the retrieved information for presentation and deliver the report via system server 304. Team members may review the report during the project baseline process at user interface 302.

Additional reports may be added and configured for presenting, including but not limited to, performance metrics measuring and tracking project quality. One report metric for tracking performance is total productive capacity, measured in hours, for an organization's labor resources. Such a utilization metric may entail a calculation of the total hours allocated Project Team Members that are actually performing scheduled tasks versus the total number of resource hours that remain unallocated. An actual cost metric compares actual cost incurred to date versus projected, or estimated, budget funding breakouts mapped to baseline deliverable items, and may track and sum project, and portfolio costs.

FIG. 3C is a logical architectural representation for the modules and database entities for the allocation algorithm. The modules may assign labor resources to project tasks for an organization's portfolio of multiple projects. The present design provides for assigning the most productive labor resource available to the most important task. Criteria processor 314 in FIG. 3A may enable an authorized team member to apply established criterion and weights from criteria database 312.

The Project Portfolio Manager may submit a request to ranking processor 320 to generate a ranking report, including a newly created project. The Project Portfolio Manager may establish the project baseline. From FIG. 3C, baseline processor 350 may generate the project baseline in accordance with the establish baseline method previously discussed, indicating the project is ready for allocating labor resources. Project processor 342 may receive input submitted by the Project Portfolio Manager via user interface 302 and create and specify the needed labor categories. Project processor 342 may also store the labor categories in labor category database 344. The project specification may include assignments for each staff member to the labor categories the staff member is deemed qualified to support. The labor categories may be stored in labor category database 346. Prior to allocating actual staff to tasks, the Project Portfolio Manager and/or authorized users may access personnel processor module 348, executing in server 304, and may enter profiles for individual staff members. The Allocation processor module 352 may determine staff member rankings within each labor category, based on profile information stored in personnel database 350. The system may store the individual staff ranking result for each labor category in labor category members database 346.

Prior to executing allocation processor 352 software module functionality, the Project Portfolio Manager may identify and specify the importance of the project critical path tasks in comparison to non-critical path tasks for the project. In the preferred embodiment, allocation processor 352 functions may involve assigning labor resources for tasks placed on the project critical path prior to assigning resources to non-critical path tasks. In general, allocation processor 352 may create a list of prioritized tasks by aggregating approved project tasks. Aggregating tasks may involve executing an algorithm configured to examine approved project scheduled tasks deemed ready for allocation. Allocation processor 352 may schedule generic labor resources, or labor categories, to tasks according to the responsibilities input by the Project Managers, such as needed or required skill level.

Allocation processor 352 allocates labor resources to tasks. The allocation processor 352 may assign the most productive staff member, within the labor category specified in the tasks, to the portfolio of projects. The allocation processor may determine the next highest ranked labor resource available for a task assignment from an ordered list of available staff generated for each labor category. The algorithm may prioritize the aggregated list of tasks, placing the tasks deemed most important in a status for on-time completion.

Figure 3D:
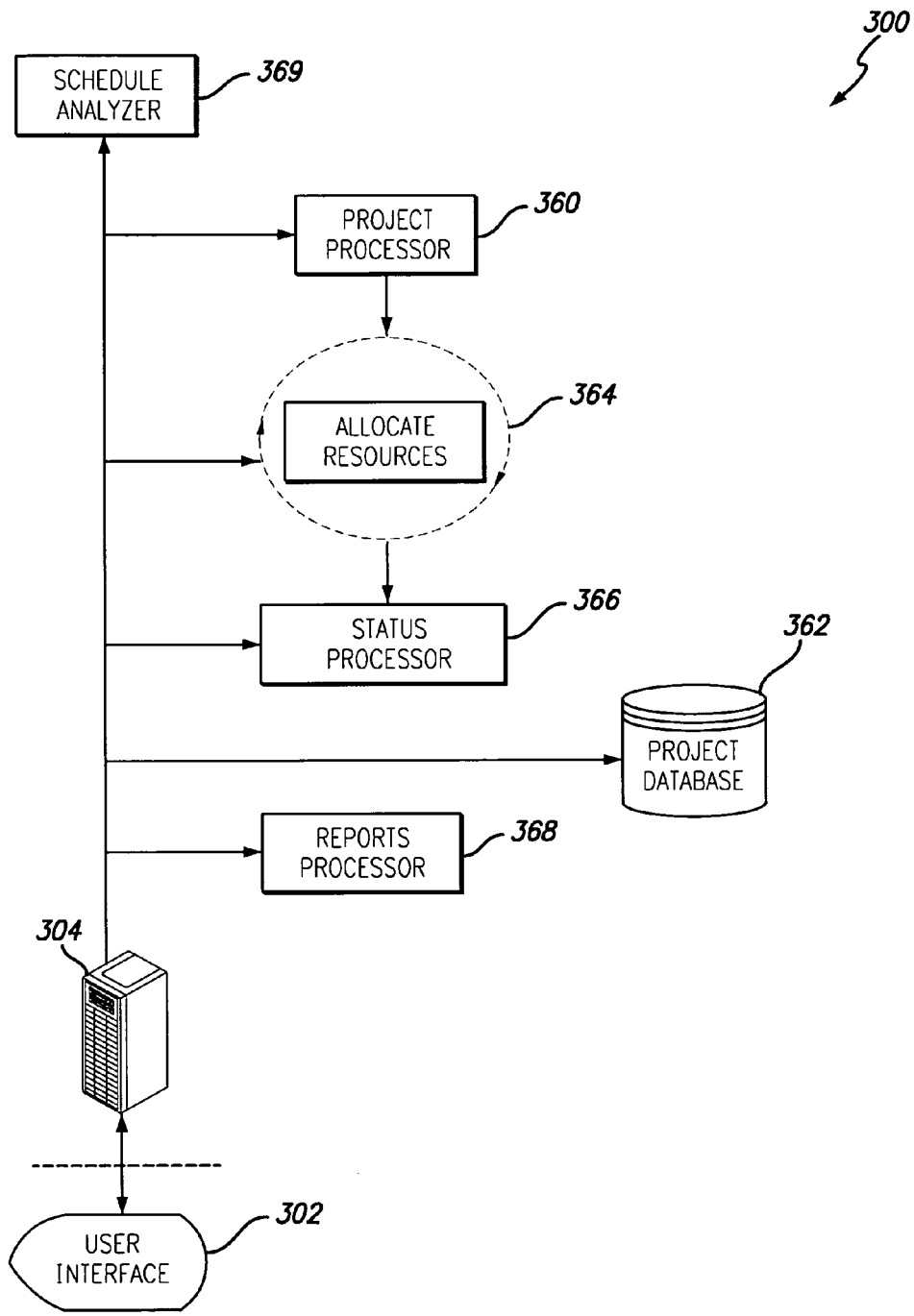
FIG. 3D is a logical architectural representation for the software modules and databases involved in determining individual performance.

Allocation processor 352 may start and continuously operate allocating actual staff members to tasks scheduled during the allocation period. The processor may store the labor resource to tasks allocations in project database 354. Determining the most productive staff members is illustrated in FIG. 3D, where staff members may submit the status for each assigned task and may include hours expended to date and a percentage value representing the task progress or if the task is finished.

Allocation processor 352 may allocate resources based on a formula for ranking tasks that accounts for project priorities. Allocation processor 352 may build a table for prioritized tasks and may adjust project task prioritization based on a project's inherent ranking and may increase a task's ranking if it is a critical path task. Allocation processor 352 may rank the prioritized tasks and store the task ranking in project database 354.

Allocation processor 352 may build a table prioritizing staff members for each project labor category stored in labor categories database 344 based on their calculated productivity. The resulting table may arrange supporting or qualified members, belonging to the categories, and may store the staff member prioritized entries in labor category member database 346. For example, in the situation where the Project Portfolio Manager designates a staff member to be assigned a specific task from the needed labor category, the staff member is mapped or pre-assigned to the designated task. Allocation processing may continue mapping resources to tasks, after the pre-assigned tasks are accommodated by allocating the most productive labor resources to the highest ranking project task, until all tasks are allocated or the staff member pool of unassigned resources is depleted.

When allocation processor 352 finishes allocating resources, for the allocation period, reports processor 356 may, upon request, publish a report containing the project assignments for each project and deliver the report for viewing at user interface 302 and also establish the information in the database so each user is provided their task assignments for the current day through the allocation period whenever they access the system Home page or login to the system. In one arrangement, reports processor may be invoked by project processor 342 for automatic generation of the staff assignments and disseminate the report to pre-determined team members, such as the Project Portfolio Managers, Project Managers, and Business Analysts indicating the actual team member assignment for the allocation period.

The allocation algorithm may stop after all project tasks from the prioritized tasks list are assigned. Allocation processing may note and inform key personnel in the situation where there are no labor resources remaining that satisfy the required labor category.

FIG. 3D is a logical architectural representation for determining individual team member performance. Such operation may include assessing and calculating a productivity factor for each labor resource while performing tasks. Calculated member productivity factors may be used by architecture 300 to rank individuals by productivity for each of the user's supported labor categories.

Team members performing project tasks may periodically access status processor 366 for entering completed tasks assignment information. Team members may enter their actual hours expended to finish the task on a regular (e.g. daily) basis.

Status processor 366 may mark tasks reported completed, sum the completed task estimated hours and calculate the needed hours to complete the task for each labor category. The status processor 366 may calculate the labor category and individual resource productivity factors and compute the associated cost effectiveness. Performance algorithm processing may complete after all project tasks in the allocation period have been completed.

Figure 3E:
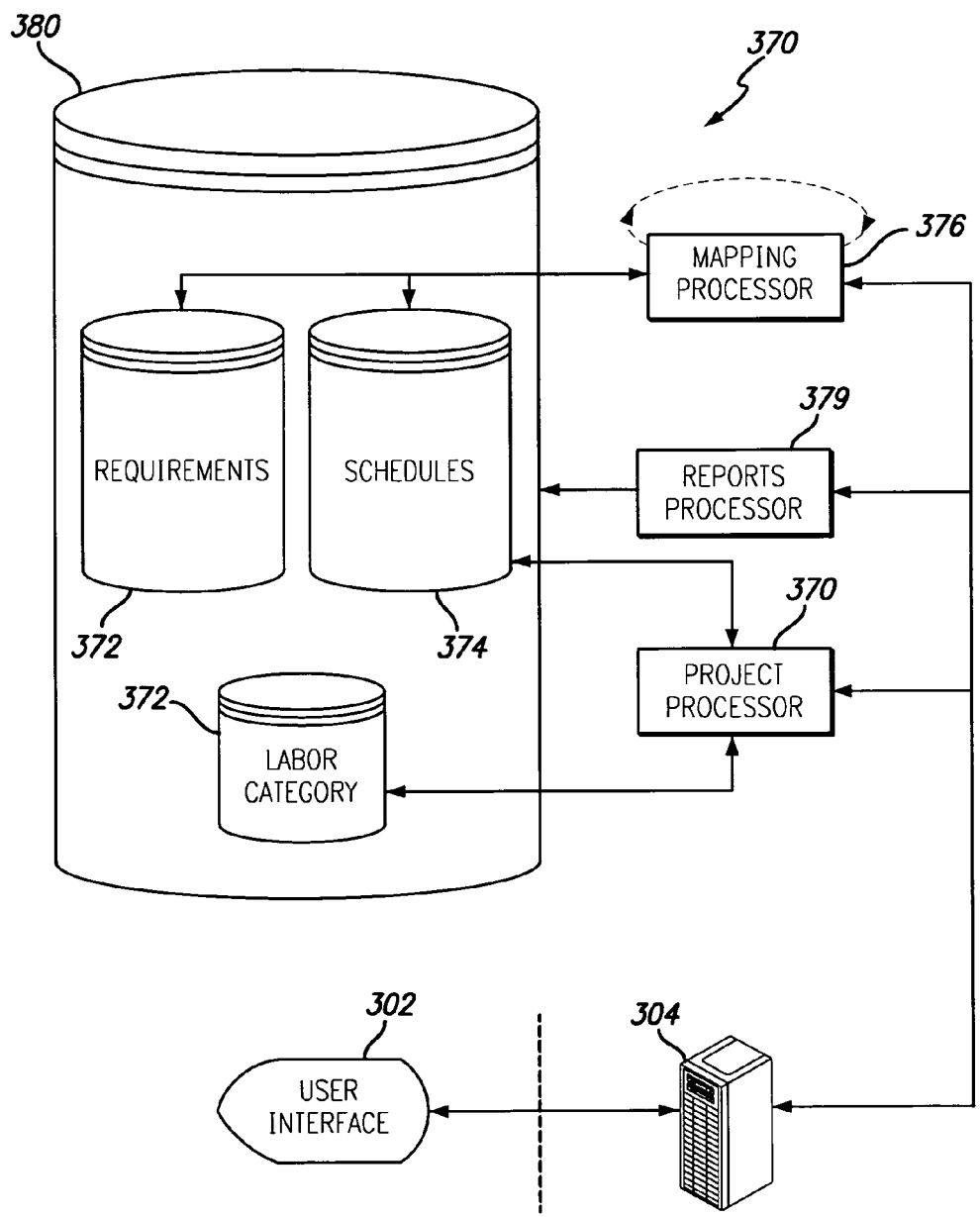
FIG. 3E is a logical architectural representation for the software modules and databases involved in realizing the project costing method.

FIG. 3E illustrates an implementation for determining project costs. FIG. 3E illustrates a process flow of project costing that determines project element costs. Project element costs may include, but are not limited to cost of a project requirement, cost-expended-to-date, cost-to-complete, and the total project cost.

Current industry accepted methods for estimating costs simply rely on formulating a project cost based on previous experiences or artificial estimates such as line of code for a software development project. In general, project costing estimates are broken down into subsets typically based on a predetermined measured amount or quantity. For example, one subset may address a roof replacement cost estimate in the construction industry. The estimate can be formulated based on the size of the activity, measured in total square feet of surface area for replacement. In the information technology industry, a subset may address developing a software application program from scratch. The computer programming industry typically estimates the number of lines of source code or some other logical software unit required for characterizing the implementation, such as function points, and the like. The summation of the individual subset costs are used to provide the total estimated project cost.

The system's method for determining the cost of implementing a project is calculated based on the fact that a project is all about the requirements. The requirements should contain everything that needs to be accomplished to successfully complete the project. The cost of implementing the requirements is the summation of all the project schedule tasks. Project costing system 370 may map requirements to project tasks for multiple projects within the project portfolio. Project requirements 372 created by the Business Analyst and project tasks 374 created by the Project Manager may be stored in project database 380. The Project Portfolio Manager may analyze the requirements and schedules to establish a project baseline.

The system may analyze each requirement as the requirement is imported into the system. If any issues are found, they are stored in the project requirements exemplary database structure illustrated in FIG. 8B. Each database element may contain a description for each requirement determined to have issues, such as being invalid, a resource being unavailable for a project schedule task, and so forth. The system may analyze project tasks using the exemplary database structure illustrated in FIG. 8C. Each database element may contain a description for each task determined to have issues. After performing a project analysis, a Project Portfolio Manager may approve the project and the system may allocate resources for the current baseline.

The Business Analyst and Project Manager may jointly or individually access mapping processor 376 to create a mapping of approved low-level requirements to the appropriate low-level schedule tasks. Mapping processor 376 considers the task features and functions, scheduled milestones, and deliverable items associated with implementing each requirement. Mapping may establish a link or relationship for each low-level requirement to one or more low-level project tasks. In the situation where a requirement is mapped to multiple low-level project schedule tasks necessary to accomplish the requirement, the Project Manager or Business Analyst may specify the percentage amount of each low-level task involved with the requirement.

Process flow may analyze mappings, generated from mapping processor 376, and verify low-level requirements are correctly mapped to one or more project tasks, ensuring low-level tasks are one-hundred percent allocated. In the situation where the costing method cannot verify the entire project's mapping, processing may return to the mapping activities realized from mapping processor 376. In the situation where the Project Portfolio Manager approves the constructed project labor resource requirements-to-tasks mappings, project data is ready for use in determining costs.

Projects processor 370 may calculate the total cost of a project, or the cost of a specific requirement for each of the established and verified mappings. Additional project costs may be determined, by calculating among other quantities, the remaining costs for partially completed projects, partially fulfilled requirements, and partially executed tasks. Each low level task's detail may include estimated labor costs and material costs, such as software tools and hardware devices, and inventory consumed, such as office supplies, facility space, and travel.

The costing algorithm illustrated in FIG. 3A, may provide automated calculation for, including but not limited to, task start and finish dates, level-of-effort costs, and costs incurred to date versus percentage of tasks completed.

It should be noted that while the logical representation, presented in FIGS. 3A-3E, of the software illustrates various blocks, modules, and components, the lines of demarcation between the various components are not hard and fast, and certain functionality may be performed by various components, including single components or combinations of components, and the functionality described herein is not a hard and fast set of requirements. For example, from FIG. 3A, reports processor 322 may include, and personnel processor 308, criteria processor 314, scoring processor 316, and ranking processor 320 may directly communicate data for execution by the presentation facilities currently configure in part with the report processor software object interfaces. Or, in an alternate implementation, a new software module, named GUI processor, may provide for the presentation functions previously disclosed as report processor presentation facilities.

Alternate Devices/Allocation Scenarios

Architecture 300 may be employed, including the rules, schemas, dictionaries, modules, servers, and components therein, to automatically allocate labor resources when the user employs different hardware and/or software components to connect to server 304. For example, the user may employ a personal digital assistant (PDA), wireless telephone or other telephone, smart phone, tablet computing device, or handheld PC configured to receive and transmit data or other receiving/transmitting hardware able to provide the functionality detailed herein. A user may employ, for example, a PDA such as a RIM Blackberry device to contact the server, log in and be authenticated, enter changes to project data, request a new baseline be established, request a report, and receive the report. The user entering data and/or appropriate responses and transmitting the response or responses in an appropriate manner, such as wirelessly, to server 304. Different devices may be configured to interact according to the functionality described herein and may provide for receipt of wireless communications, such as over a secure channel or protocol, and may thus enable the user to use devices other than personal computers to interact with the present system.

Allocating Labor

Figure 4A:
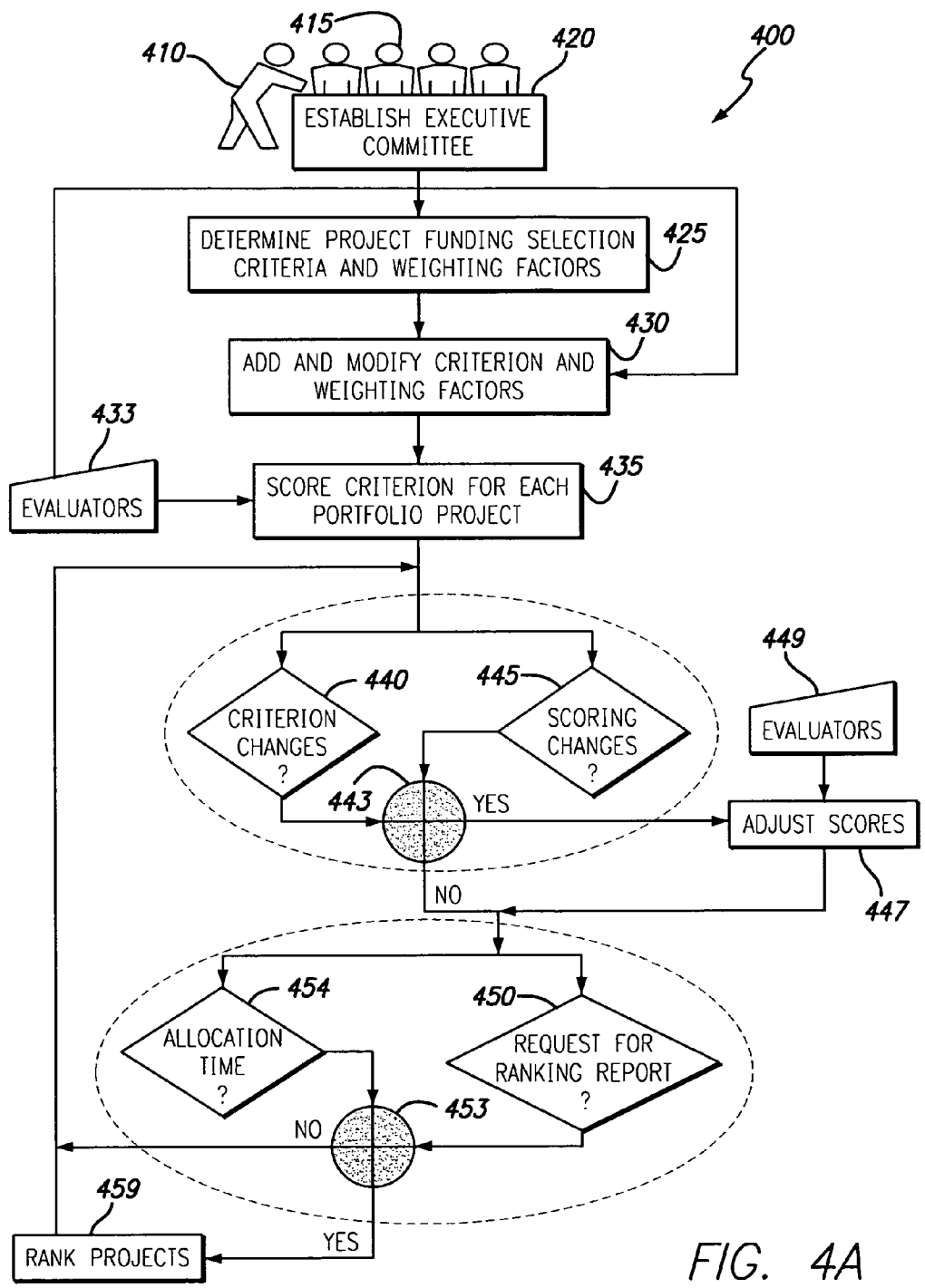
FIG. 4A illustrates a process flow evaluation and selection method for scoring and ranking proposed projects under funding consideration.

FIGS. 4A, 5A, and 6-8 describe the major process flows for the present system. FIG. 4A illustrates a process flow for a project evaluation and ranking method in accordance with one embodiment of the present design. The process flow for ranking projects involves entering project selection criteria to evaluate proposed projects. Each criterion is assigned a score for each project by selected evaluator. The process flow may access and retrieve scores entered from the evaluators, apply entered scores to pre-established criterion and weighting factors for each project, total the resulting criterion scores for each project, in a portfolio containing multiple projects, and order the projects based on the total scores. The highest score becomes the most important project, the next highest becomes the next most important project and so forth. The ordering of generated scores establishes the ranking for multiple proposed projects and may be used to determine which projects are to be funded. Project selection criteria entries may include a weighting (importance) factor. The weighting factor may be represented by a numerical value indicating the relative level of importance with respect to the overall project criterion.

The present method may assign a default value for each weighting factor signifying the importance relative to the initial system populated default criterion. The criteria weighting table may support the entry for user defined names for criteria and custom weighting factors. The present method may multiply individual evaluation score for each project by the weight assigned for the criterion, thus generating an evaluation score. If, for example, a user wishes to allocate greater weight to cost of an individual project than return on investment during the first year of the individual project than is provided by default, such a difference may be reflected in a user defined weighting for specified criterion. The process flow arrangement may add the generated scores and sum each measured project criteria for each project. The scores generated may provide input to the mechanized facility, illustrated in FIG. 4A, to determine an ordered ranking of proposed projects. One example of ordering is ordering from highest total project score down to the lowest generated score.

Figure 4D:
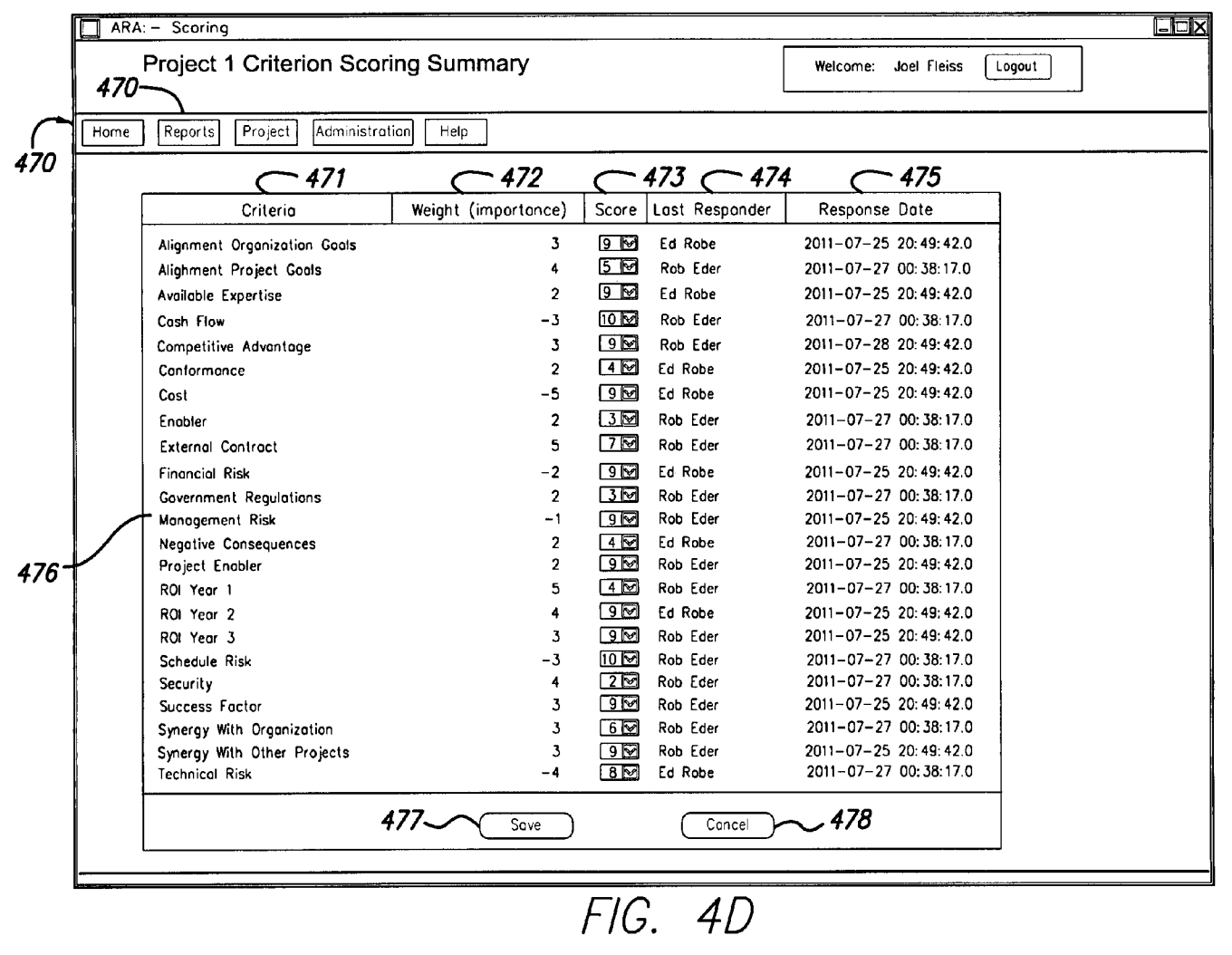
Figure 4E:
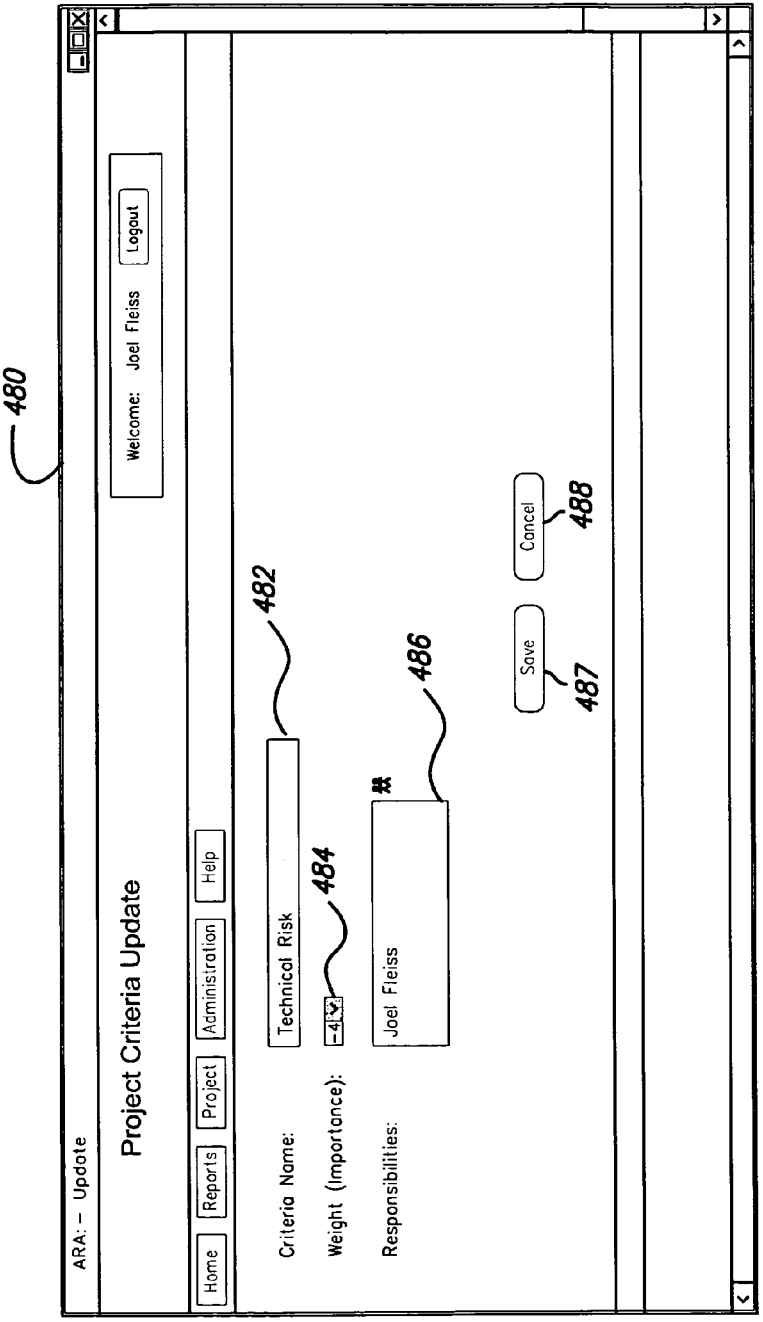
FIG. 4E represents a general layout for updating the attributes of a criterion.

To provide a general feel for the type of screens that may be encountered and used by the individuals accessing the system, a general set of screen shots are presented in FIGS. 4C-4E. These screen shots represent a general illustration of the present design, but alternate views, information, and rendering layouts could be presented, and thus the screen shots presented here are not intended to be limiting.

Referring to FIG. 4A, the project ranking algorithm may generate and distribute a ranking for ordering proposed projects, under funding consideration, from the highest to lowest scored project. The ranking and scoring may continuously operate and may provide for near real-time data and information regarding proposed projects. The system may distribute the data generated for viewing by Executive committee members 415, participating and responsible for choosing which projects obtain funding.

Executive 410, such as the corporate CEO, or other user assigned to fulfill the duties and responsibilities for the CEO position, may task members from his team to participate in determining how projects are selected for funding by the organization. Executive 410 may establish an Executive committee at point 420 from the organization's staff.

Executive committee members 415 may influence the importance of each criterion (weight) used for the ranking for proposed projects and those staff members authorized to input scoring data for the projects in the portfolio based on their defined roles within the system. Executive committee members 415 may insert selection criteria and a numerical weighting factor at point 425 or may accept the preconfigured default weight. The weight assigned may indicate the relative level of importance for the inputted selection criteria. Members may directly influence the project funding selection process results by adjusting the relative weight of a criterion compared to the entire set of selection criteria available in the system. Increasing and decreasing the assigned weight adjusts the relative importance of the criteria being influenced as compared against importance of each of the criterion in the set.

For example, a member may input criteria for evaluating the 'financial risk' for each project under consideration. A selection criteria may be assign a negative numerical value weight to imply that an increase in a measured score for the selection criteria decreases the probability for funding approval by the Executive committee members. For example, a weight of 'minus two (−2)', as illustrated in FIG. 4C at point 467, indicates in this example that 'financial risk' is more important than criteria having a weight larger than minus two, such as 'government regulations' and 'ROI Year 1'. A weight of 'minus two (−2)' indicates in this example that 'financial risk' is less important than criteria assigned a weight smaller than minus two, such as 'Cash Flow, and 'Security', shown in FIG. 4C.

The system may use the criterion, with assigned weights to calculate and generate a ranking for all proposed projects under consideration. The ranking and scoring may enable, at point 430, the Executive committee to modify preset system default weight values for each of the criteria they submitted and stored in the database, and add or delete project selection criteria dynamically as needed. The evaluation and ranking method process flow 400 operates in an iterative, or cyclical, manner for proposed and ongoing active funded projects, and may execute continuously at the end-of-business in the system environment every day. Continuous operation may involve arranging a processing loop to repeat the ranking method process flow 400. The present arrangement may provide for near real-time data and information updating in response to a dynamically changing environment where changes may occur on a daily basis.

Executive Committee 415 may select individual team members as evaluators 433. Evaluators use scoring criteria at point 435 for the organization's project portfolio. Ranking method process flow 400 may enable evaluators 433 to submit a score for each project based on the established criteria.

A project score database structure, illustrated in FIG. 4B, may represent and contain an entry for each named criterion, default weight value, and assigned individual. The project score database may contain as entry for each criterion for each project. The exemplary database structure element may contain selected staff members, for each exemplary role shown, participating in assessing and asserting a score for the project criterion. For example, the database structure may arrange information regarding the duties and responsibilities for each role necessary to form a scoring team.

At the end-of-business each day when the evaluators 433 have finished adjusting their scores (if any) for all criteria for projects proposed within the organizations portfolio, the proposed projects are ready for ranking. Proposed projects may involve criterion changes at point 440 for an existing project previously scored and submitted for allocation and ranking. Criterion evaluators may examine the project for any changes, where the change may occur as a result from inside and/or outside influences. Criterion evaluators may adjust their scores for each of their organizations' projects to reflect the effect of the influence.

Scoring changes 445 may involve updates to existing criterion scoring resulting from measurements that modify the existing score. The present design may involve continuously examining project selection criteria to detect changes to criterion or scores at point 443. The process flow arrangement may route projects with detected changes for consideration and review to the appropriate evaluators at point 449. Criterion evaluators may examine the project for any changes, where the change may occur as a result from inside and/or outside influences, relative to their criterion. Criterion evaluators may adjust their scores for each of their organization's projects to reflect the effect of the influence. For example, a project with a major "Technical Risk" score may diminish significantly as the project proceeds towards completion.

The present method may determine and report portfolios multiple project rankings based on external changes and influences. For example, a positive economic projection or forecast, or announcements by competitors, and like effects identified from current and developing conditions outside, may be accommodated and accounted for by altering scores and/or weightings for a competitive advantage in optimizing for selected projects. By adjusting scores at point 447, based on changes 440 and scoring changes 445, the changes from outside conditions are included in the ranking process flow method. Evaluators may modify scores in response to Executive committee members updating selection criteria at point 430. The ranking algorithm may continuously cycle through the adjust scores process flow loop to further adjust and refine evaluation assessments.

The iterative flow arrangement may provide for dynamically changing selection criteria, or weighting factors, where the system may update the project ranking results based on changes made. The system may, for example, recalculate the project ranking results on a daily basis at the end-of-business every day. At the end-of-business after calculating the ranking of each project, the project data is ready for mechanized resource allocation. A Project Portfolio Manager, Executive committee member, or other authorized user may request an allocation of resources, and may invoke the present automated resource allocation algorithm at point 454 prior to the end-of-business. Requests for reports or automated resource allocation may be identified using the 'OR' processing function at point 453 and may submit the projects for ranking at point 459. In the situation where no ranking reports or requests for ranking the projects are submitted for consideration by the system at the end of each business day. The process flow may return to examining the project database for detecting further criterion changes 440 or scoring changes 445.

The committee members may request various preconfigured reports, including reports involving summary and detailed reports, such as a project criteria listings report illustrated in FIG. 4C. The listings report may enable committee members to formulate funding decisions during the funding review period and select from proposed projects. The system may generate a report, or set of reports, in response to a request ranking report 450.

The ranking report may provide the requesting member with scoring and ranking results. The selection process flow may include determining a score for each proposed project based calculation involving selection criteria and weight or other appropriate value. The present rank projects operation 459 may multiply each project's measured score with the criterion weight to determine a criterion result, where the total score for a project may be calculated by summing the resultant criteria.

FIG. 4C shows an exemplary web page for rendering criteria listings page. View 460 has project criteria information particular to a project being considered for funding. In general, the execution results from invoking the project processor module is addressed in this page-view. This view shows how the results of the projects processor module obtaining data from the databases provide the necessary information to display a project's ranking. Criterion listing 460 is accessed by the member selecting the Administration tab at point 461. The system may render an Administration tab pull-down menu items list presenting a menu items named criteria, not shown in FIG. 4C, where tab selection the criteria item renders a page-view presenting criterion listing screen 460, illustrated in FIG. 4C.

Project criteria listings page-view 460 typically indicates the organizational division name, at point 463, criteria name 464, criteria weight 465, and the responsible responders at point 466 for criteria name 464. Project criteria listings page-view 460 may include the name of the signed in user, at point 469, and provides a column providing a button for invoking an 'action', listed in action column, at point 462, where one 'action' selection button is provided for each criteria name 464. A Project Portfolio Manager may submit additional criteria for inclusion with the preset system provided default criteria by selecting insert new button 468.

FIG. 4D illustrates an exemplary criterion scoring page-view 470 screen for rendering with a client browser. The scoring page-view is activated and rendered by the member selecting, or clicking, on a criterion scoring command from the Project tab, for example provisioned as a pull-down menu item rendered from selecting administration tab 461. Selecting 'action' button, at point 462 may render criteria update page 480 for a member to update the selected criteria.

Criterion scoring page-view 470, illustrated in FIG. 4C, presents an exemplary browser web page for rendering a summary listing of criteria for a project. Information particular and relevant to a project under funding consideration, for viewing by the Executive committee members, in response to a member submitting a report request, where the most recent database contents stored in the system are processed for viewing.

In general, the execution result from invoking the various software module functionality is being addressed in this page-view, namely how the system obtains data, stored in memory by the server, from the databases, illustrated in FIG. 3, where software executing within the modules may generate the criterion scoring page. Project criterion scoring information typically provides the selection criteria, at point 471, criteria weight, at point 472, criteria score 473, last member responder, at point 474, and the response date and time, at point 475. Project criterion scoring page-view may include a descriptive name for each criterion, such as Financial Risk, at point 476, and the name of the responder, at point 469.

A selected Responder may submit a change for a criteria score by selecting the Criteria Score 473 command from the Project tab and choosing a different score for assignment to the criteria. The Responder may save, at point 477, the updated scores, or may cancel, at point 478, by selecting the appropriate button available at the bottom of the page.

FIG. 4E represents a general layout for criteria update page-view 480 report when activated. In this view, at point 482, the criteria name, selected from the scoring screen, is presented along with the currently assigned weight, or importance, at point 484. The responsibilities 486 may be submitted by a Project Portfolio Manager who may input a new or revised description at point 486 specifying duties with regards to the criteria being scored. A member/user may submit a change for a named criteria weight by selecting weight 484 from a pull-down menu, provided to the left of the currently assign value, and choose a different weight for assignment to update the criteria. The member may save, at point 487, the updated weight, or may cancel, at point 488, the activity by selecting the appropriate button available at the bottom of the page, illustrated in FIG. 4D.

Figure 5A:
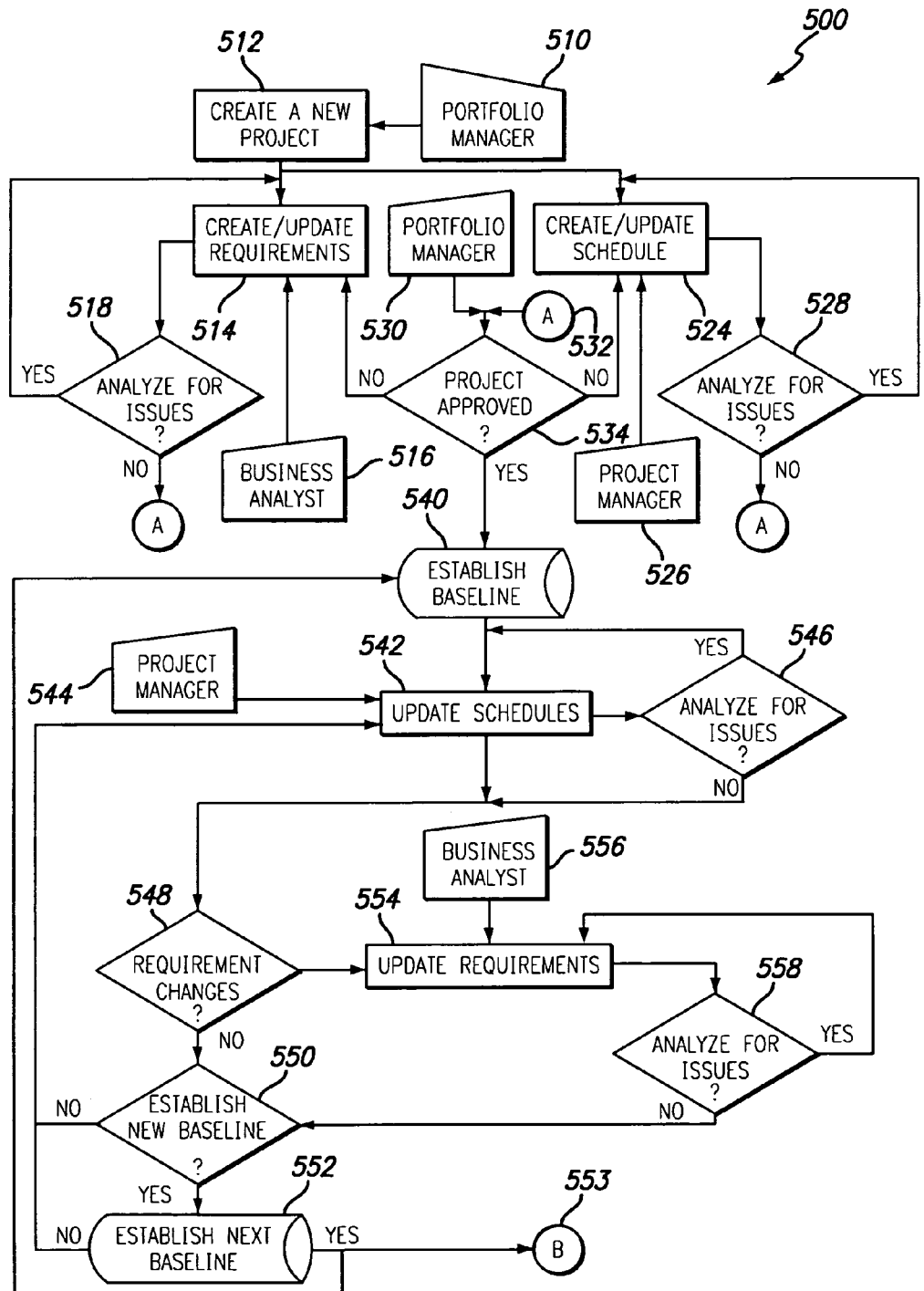
FIG. 5A illustrates a process flow data quality method for analyzing project requirements and schedules in accordance with one embodiment for the present design.
Figure 5C:
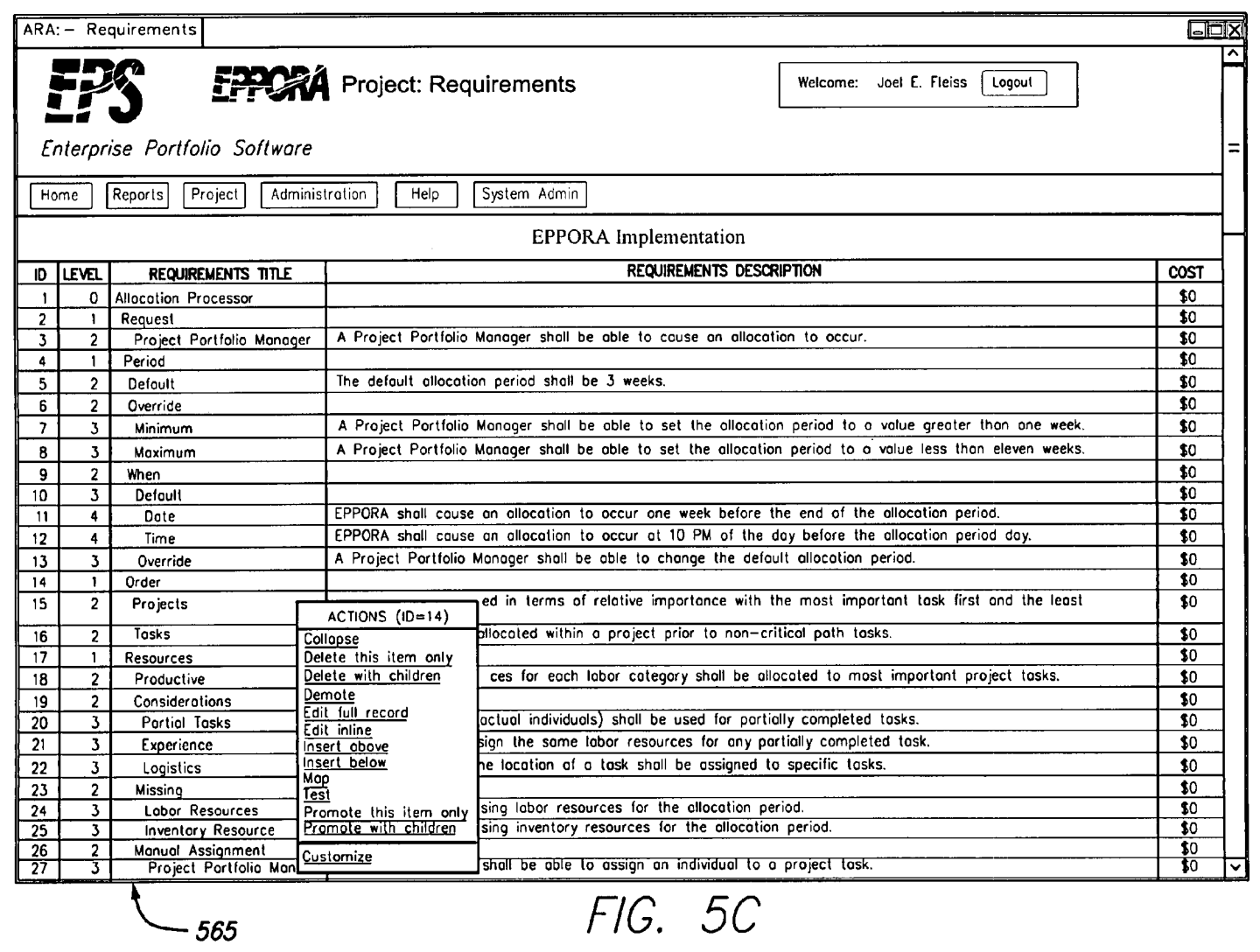
Figures 1, 5H:
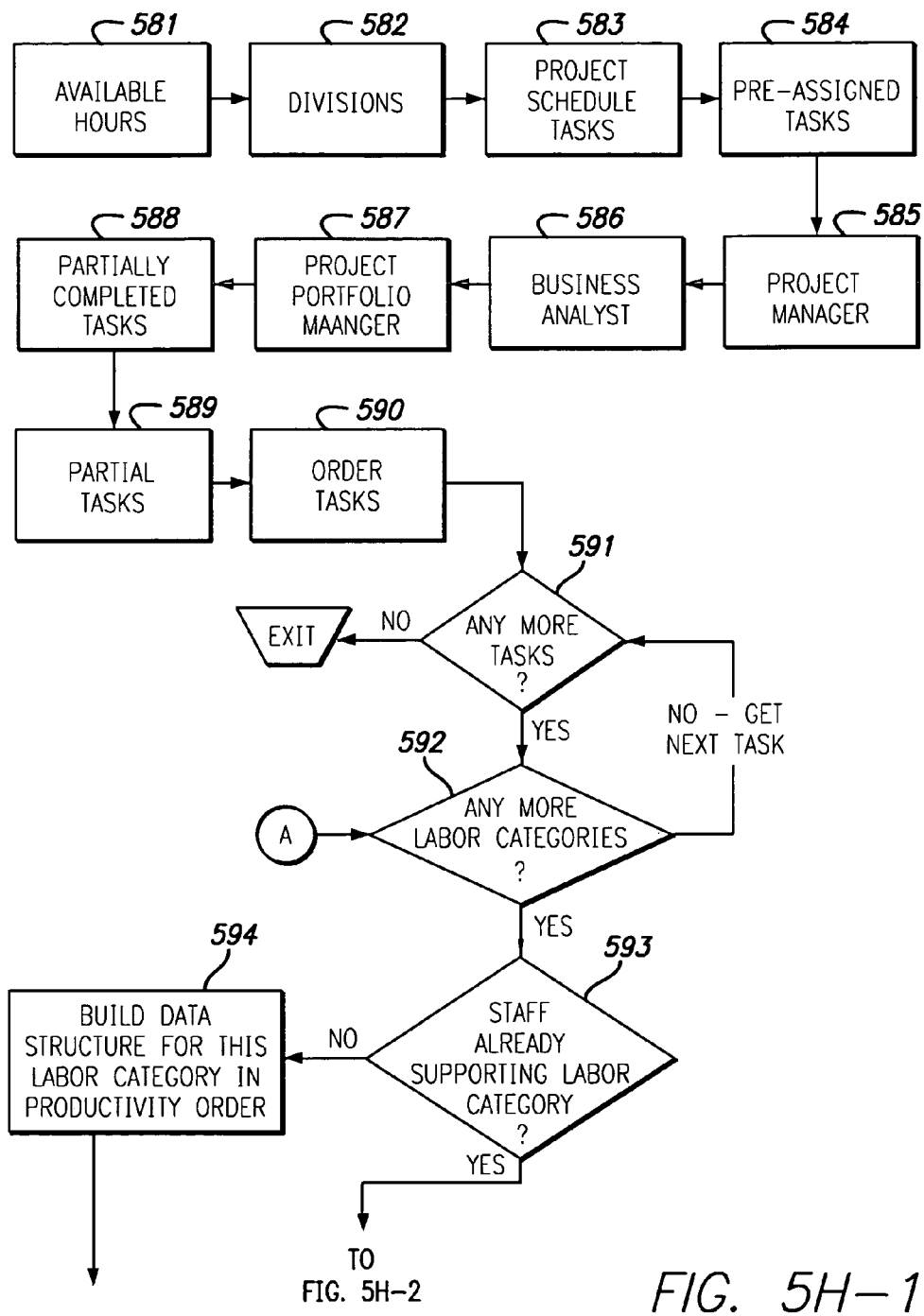
FIG. 1B illustrates the attributes needed for the personnel database structure, representing each individual Project Team Member by an element containing the information.
FIG. 1C is an exemplary default criteria weight table used to select an organization's project portfolio in accordance with one embodiment for the present design.
FIG. 1D is an exemplary table providing an activity list of responsibilities for a Project Portfolio Manager.
FIG. 1E is an exemplary database structure in accordance with one embodiment for the present design.
FIG. 1F is an exemplary report database structure.
FIG. 5B shows an exemplary project attributes page-view for rendering current project information.
FIG. 5C shows an exemplary project requirements page-view presenting a list of requirements particular to a project.
FIG. 5D shows an exemplary approved schedule tasks page-view presenting a list of schedule tasks in accordance with one embodiment for the present design.
FIG. 5E shows an exemplary list of activities performed by the system, such as on a daily basis.
FIG. 5F illustrates tasks to optimally allocate labor resources.
FIG. 5G shows the process of optimally allocating labor resources across all approved projects.
Figures 2, 5H:
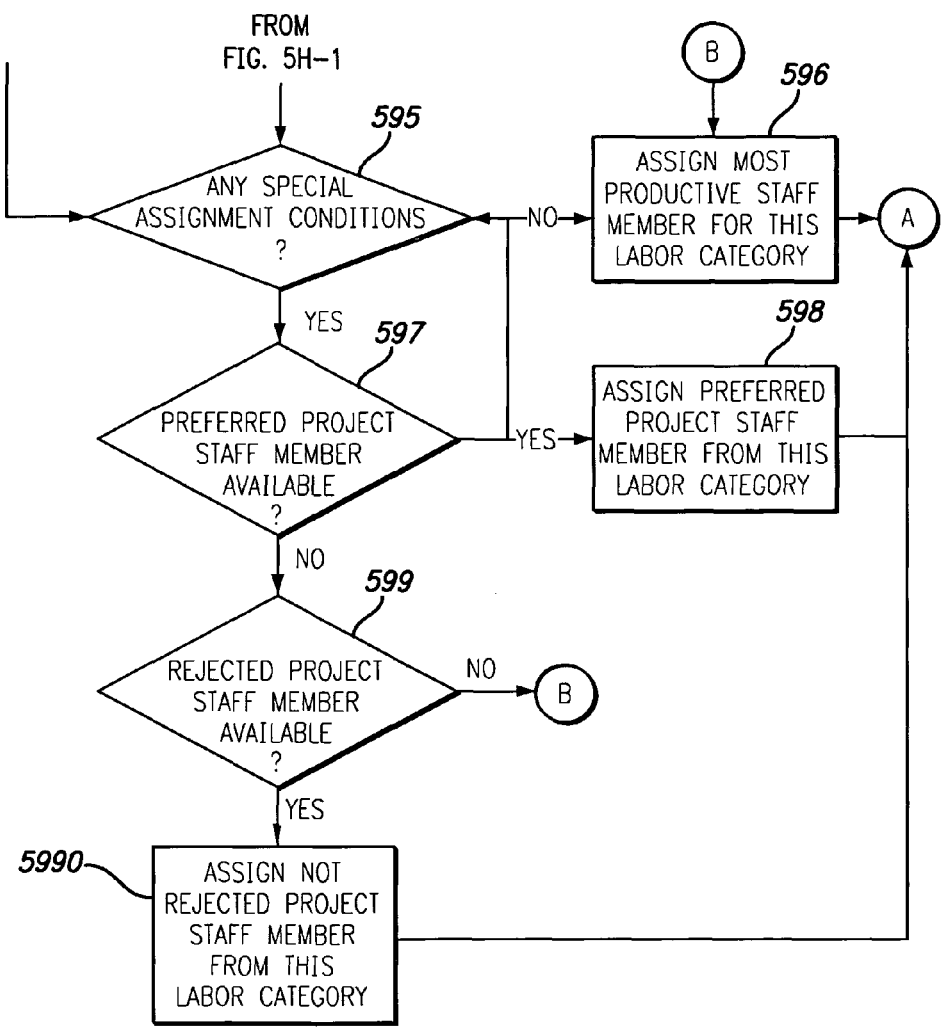

FIG. 5A illustrates a process flow method for establishing multiple concurrent projects' baseline for establishing key metrics after completion of a major milestone (such as a phase within a project) that can be used later in comparison with the current status of a project. Baselines also provide the ability to step back to a known place in case the current database for a project is corrupted. The process flow may involve analyzing project requirements and schedules to detect and resolve data quality issues.

The present design may configure an established baseline algorithm. Standards organizations have established processes and measures for implementing quality projects emerging from industry member collaboration and consensus as to using baselines for measuring progress.

FIGS. 5B-5D provide a general feel for the type of screens that may be encountered and used by the individuals accessing the system. A general set of screen shots are presented in FIGS. 5B-5D. These screen shots represent a general illustration of the present design, but alternate views, information, and rendering layouts could be presented, and thus the screen shots presented here are not intended to be limiting.

The system may execute the algorithm illustrated in FIG. 5A to establish baseline process flow 500. The process flow continuously monitors project data for identifying changes to the data. The process flow arrangement may provide for dynamic project change control. The establish baseline algorithm may provide for active, continuous, and dynamic method for identifying changes to project data, input by an authorized Project Team Members. The process flow may provide for data analysis facilities, such as examining project requirements and schedule to meet, or exceed, recognized industry standards for implementing quality projects.

In another embodiment of the present design, the algorithm may provide automated reporting for data changes identified and may communicate the change to the designated team members, such as delivering a communication containing details regarding the desired change. Automated communications facilities may be arranged for sending the communication via email or an internal messaging system that is presented upon each user's home page. In a further arrangement the process flow may involve sending a message to an email client that belongs to a designated team member, for example an Internet based webmail service, or Microsoft's Outlook and Outlook Express products.

Referring to FIG. 5A, the system may provide input and storage facilities for Project Portfolio Manager 510 to create a new project 512 in the database. Project Portfolio Manager 510 may assign the creation and maintenance tasks for the newly created project to Business Analyst 516 to establish requirements. The Business Analyst may create and update project requirements 514 data entries, typically using add, delete, and modify functionality, for their assigned proposed or active project.

As the Business Analyst creates and maintains project requirement, the system analyzes the requirement. The present arrangement may identify and resolve problems within the scripted requirements data. Requirements processing issue analysis functionality, at point 518, may involve, for example, examining the Business Analyst scripted requirements content for identifying and resolving ambiguities present, ensuring stated terminology is used in a consistent manner, separating compound requirements into multiple requirements to facilitate comprehensive test case conduct and coverage, and the like.

In the situation where the present design identifies issues with either newly submitted or modification to a previously submitted requirement, the process flow algorithm returns the requirement to Business Analyst 516 for resolving the issue(s) found. The software may execute the requirement update and analysis process, illustrated in FIG. 5A, and automatically cycle through each project requirement until no requirement issues are found. In addition, at end-of-business all unresolved issues are sent to the parties of interest for timely resolution.

Requirements examined and deemed as consistent and compliant with known standards, shown as 'A', at point 519, may result. When the quality algorithm for realizing the cyclic and iterative process flow finishes, where no further issues are detected nor identified, the requirements are ready for Project Portfolio Manager 530 approval. The system may provide fully vetted, issue free, project data, from a flowchart perspective, at 'A', at point 519, at 'A', at point 529, and at 'A', at point 532.

The algorithm arrangement may provide for analyzing scheduled tasks data such as, including but is not limited to, examining the task data content details for identifying issues and/or inconsistencies. The arrangement may provide for resolving deficiencies found during examination and may route the unaccepted task to the Project Manager for mitigation. In addition, at end-of-business all unresolved issues are sent to the parties of interest for timely resolution.

Project Portfolio Manager 510 may assign the creation and maintenance tasks for the newly created project to Project Manager 526 to establish the project schedule. Project Manager 526 may create and update project schedule 524 data entries, typically using add, delete, and modify functionality, for their assigned proposed or active project. As the Project Manager creates and maintains project schedule tasks, the system analyzes the submitted tasks. The present design algorithm arrangement may identify problems within the schedule data. Automated schedule processing may analyze data for issues at point 528. The analysis method may involve examining schedule content scripted and input from Project Manager 526. The content may be examined to ensure accurate, consistent, and repeatable scheduling best practices are followed. The content may be compared with a preselected standards foundation. The standards foundation may include quality measures generated internally within the organization, and external quality measures established and recognized as industry accepted.

In the situation where the algorithm identifies an issue with project data requirements or schedule tasks at point 528, originating from newly submitted or from modification to a previously considered schedule, the algorithm configuration returns the schedule to Project Manager 526. The Project Manager may resolve the issues found by entering data for modifying project schedule. The software may execute the schedule update and issue analysis processes, illustrated in FIG. 5A, and automatically cycle through each project schedule items content until no further schedule issues are found. Schedule items examined and deemed as satisfying the conditions published in known standards, shown as 'A' at point 529 may result. When no further issues are detected and identified, the schedule is ready for Project Portfolio Manager 530 approval. The system may move, from a flowchart perspective, the issue free data from 'A', at point 529, and delivered the data to 'A' at point 532.

The analyzing method is a dynamic process, readily available to accommodate a project change control procedures and processes. For example, the present method may automate the identification of the individual team members affected, or involved, with change. In a further example, the method may generate and communicate a 'change control message' that includes detailed data and information regarding the change.

The method may notify the project's Project Portfolio Manager, Business Analyst, Project Manager, stakeholders, Executives, and Project Team Members when a requirement change does not meet the quality goals established for the project. Change control items that do not meet established quality goals may be revised.

Designs adhering to the process flow arrangement for the functionalities disclosed herein form a basis for the present design overall facility for developing and implementing quality projects. For purposes of disclosure, the phrase 'quality projects' refers to metrics that are measured at project completion, where a 'quality project' achieves the following goals, including: meeting or exceeding the project's functionality as specified, meeting or bettering timing for scheduled deliveries, and for project completion at or below originally established funding, i.e. total cost.

In the situation where the project is approved at point 534, the system may establish a baseline for the project at point 540. In the situation where the Project Portfolio Manager rejects the project requirements, the requirements are returned for mitigation by Business Analyst 516. Where the Project Portfolio Manager rejects the project schedule, the scheduled tasks are returned for mitigation by Project Manager 526. In certain situations, the Project Portfolio Manager may reject both requirements and schedules associated with the project.

Update schedules data at point 542 may be analyzed for issues resulting from scheduled item changes, originating from Project Manager 544. The algorithm facilities may provide for analyzing the data resulting from execution of the update schedules software. The analyze issues functionality, at point 546, may be realized from emulating the update functionality at point 524. The algorithm may continue cycling through the processing arrangement illustrated in FIG. 5A. The algorithm may exit the cycle once all the examined project schedule data meets the quality metric(s) and no issues are detected, in accordance with the quality process flow method disclosed. The projects issue free schedule is stored in the database and available for further project quality processing.

The method may examine the project, incorporating the schedule changes originating from Project Manager 544, for data indicating a requirement change at point 548 or multiple requirement changes are found. In the situation where no requirement change at point 548 is detected by the algorithm, the newly established baseline at point 552, generated by the software, may accommodate and reflect the impact resulting from either changes to requirements at point 548 or updates to schedule items, at point 542, or in combination.

Business Analyst 556 may update, e.g. add, change, and delete, requirement data from the current baseline content generated when the baseline was last established, at point 552, and any modified requirements that resulted from Project Manager 544 updates to the project schedule, at point 542. For example, the Project Manager may reflect the impact resulting from a newly added or changed scheduled item.

Automated requirements processing may analyze data for issues, at point 558. The analysis method may involve examining requirements from a quality perspective using a method similar in functionality to that described for create and update requirements 514 software facility. The Business Analyst may update requirement 554 data entries, typically using add, delete, and modify functionality, for their assigned proposed or active project. As the Business Analyst maintains project requirements, the system analyzes the requirements. The present designs algorithm arrangement may provide for identifying potential problems within the scripted requirements data as disclosed previously.

In the situation where the present design identifies issues with the modifications to a previously submitted requirement, the process flow algorithm returns the requirement to update schedules 542. The system may notify Business Analyst 556 of the issue(s) found, requiring further refinements for resolution. The software may execute the requirement analysis process, illustrated in FIG. 5A, and automatically cycle through each project requirement until no requirement issues are found. When the algorithm for realizing the cyclic and iterative process flow finishes, where no further issues are detected and identified, the requirements are up to date, at point 554, and available for approval.

The Project Portfolio Manager establishes a baseline process flow 500 configuration may involve performing quality analysis for project data stored in the database. The project data stored in the database may include the requirements and schedule items, available for use with the analyzing algorithm arrangement, illustrated in FIG. 5A. In this arrangement, the system may simultaneously provide for accessing and processing multiple proposed and active projects concurrently.

FIG. 5B shows an exemplary web page for rendering project attributes page 560 presenting current project information particular to a project, for example a proposed project under consideration for funding. In general, the screen rendering presents current project details, including but not limited to, baseline number in effect, project start and estimated completion date, number of hours expended, and number of task completed.

FIG. 5C shows an exemplary web page for rendering project requirements page 565 presenting requirement information particular to a project. In general, the screen rendering shown presents the current project baseline and description for current in-effect requirements.

FIG. 5D shows an exemplary web page 570 for rendering the currently approved schedule task's item criterion responder name and description, and like information, particular to a project. In general, the screen rendering shown presents the project schedule and attributes for current in-effect schedule tasks items.

The page-views for reporting and entering project data disclosed herein can be provided in various page-view formats and are not limited by the example screens provided.

FIG. 5E shows an exemplary list of the types of data verification that may be performed on a regular or periodic basis, such as daily. The indicators enclosed in parentheses PPM (Project Portfolio Manager), PM (Project Manager), BA (Business Analyst), ADM (Administrator) and SP (Sponsor) are used to indicate the entity receiving a message when an issue is discovered. A "/P" signifies that only this user type for the specified project receives the message. FIG. 5F represents a list of labor resource allocation tasks.

FIG. 5G is a flowchart representing the allocation of labor as performed by the system. The present design determines the available hours 581 for all Project Team Members. This may consider vacation and sick days in addition to the each individual's available hours for the allocation period. The project allocation is on a division basis for projects 582 for each of the divisions within the organization. The system gathers all low-level project tasks 583 for the selected division's projects for the specified allocation period. The system then determines which of the gathered task has pre-assigned resources 584, and moves those tasks to the allocated task group. The system then looks to see if any of the labor categories are "Project Manager" and assigns the project's Project Manager 585 to the task. The system then determines if any of the labor categories are "Business Analyst" and assigns the project's Business Analyst 586 to the task. The system then looks to see if any of the labor categories are "Project Portfolio Manager" and assigns the project's Project Portfolio Manager 587 to the task. The system then assigns the same resources for any tasks which were partially completed 588. All tasks that are partially completed 589 are placed in the allocation stream to receive resources. The system then orders the tasks based on ranking 590. The system then sets up a loop 591 to go through the tasks. If no more tasks, then the allocation process is over. The system then sets up a loop 592 to traverse the needed labor categories for this task. If no more labor categories, then we return to allocating the next task 591. Check to see if we have already established a list of available users for the designated labor category 593. If we haven't established a supporting staff for the designated labor category, then establish a database with the available resources in productivity order 594. A check is then made to see if there any special assignment considerations 595. If a preferred staff member for the designated labor category is available 597, then he/she is assigned to the designated task for the designated labor category 598. If there are no special considerations, then the most productive available resource for the designated labor category is assigned 596. The system sees if the Project Manager or Project Portfolio Manager designated a staff member as not desirable, in which case the most productive that is not classified as not desirable is assigned 5990.

Figure 6A:
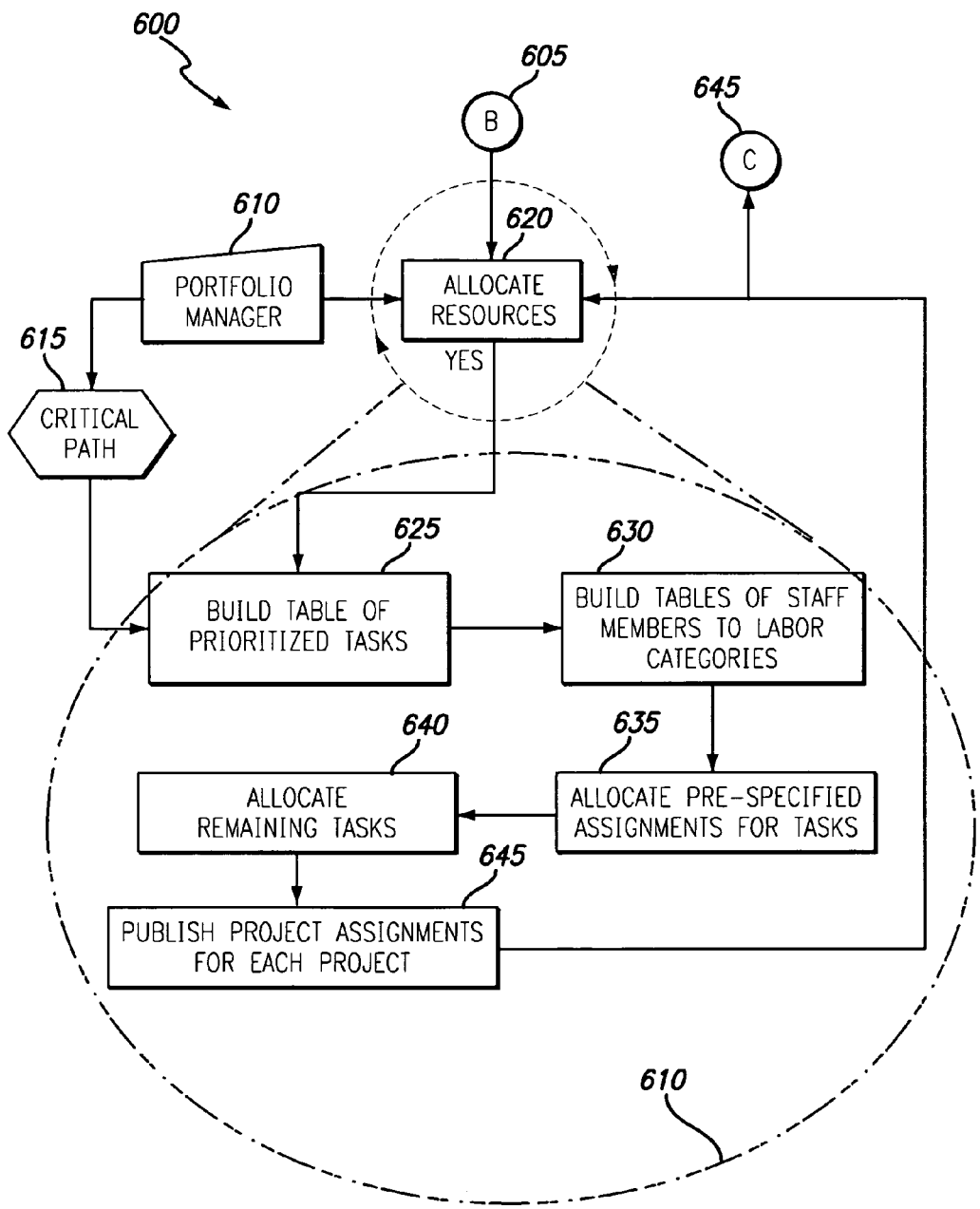
FIG. 6A illustrates a process flow method for synchronous assigning and publishing project tasks, from multiple concurrent portfolios containing multiple concurrent parallel projects in accordance with one embodiment of the present design.

FIG. 6A illustrates a method for allocating labor resources process flow 600 to tasks. The method may involve an allocation algorithm configured to obtain and prioritize task from information details contained in each generated established projects baseline, refer to FIG. 5A. The allocation algorithm configuration may obtain project evaluation and ranking information, refer to FIG. 4A, for use in refining the prioritization of tasks.

Prior to allocating resources, the Project Portfolio Manager may approve the project requirements and schedule as the basis for establishing an approved project. The system uses approved projects during the allocation process. For example, the project information may include descriptive information indicating that a task is placed on the critical path, indicating level of complexity, required labor category, and the like. Each project may provide for a set of fully vetted requirements and schedule items, or tasks, that meet or exceed specified standards, illustrated previously in FIG. 5A.

The Project Portfolio Manager may specify the labor categories required for all projects in the Project portfolio.

Project Portfolio Manager 610 may assign one or more labor categories to each user for identifying each category the team member is competent to perform the associated duties and responsibilities, previously illustrated in FIG. 1A. Prior to allocation of resources, a Project Manager or a Project Portfolio Manager may assign generic labor resources, or labor categories, instead of actual individual team members to the schedule tasks.

Allocating labor resources process flow 600 software arrangement may invoke allocate resources 620 functionalities, after a preconfigured time span elapses or as requested by the Project Portfolio Manager. For example, scheduling an allocation, within a two to ten week range, may provide for maximum utilization for an organization's labor resources. The present design's allocation process does not require allocating resources to tasks for an entire project. The present design may allocate actual resources for tasks prioritized within the allocation period. The allocation period varies between two and ten weeks, where the organization can choose what is meaningful for their organization (default is two weeks). In general, the algorithm may provide for assigning the most productive individuals within a needed labor category to the project tasks of the greatest importance (ranking). The present method for determining the most productive individual for a task entails, whenever a task is completed, the estimated hours for the task are added to the worker for the designated labor category as well as the number of hours expended. The ratio of estimated to expended hours determines a user's productivity for the expended labor category. Productivity is the division of the number of hours worked versus the estimate of number of hours. Such hours can be continuously adjusted as Project Team Member's complete tasks.

The system determines which project schedule tasks are on the critical path 615. Tasks on the critical path are those tasks within a project that effect the end date of a project. Critical path 615 tasks may significantly effect, or delay, the project's completion date. As tasks are completed on a regular basis, such as daily, it is possible the critical path tasks for a project change. Thus, whenever there is a change to a project's tasks the project's critical path is re-calculated.

The allocation algorithm, illustrated in FIG. 6A, may calculate the project's critical path by assigning a productivity factor of one (1.0) for each low-level task assigned to a labor category. The present design may compute the project's critical path by calculating total float for each low-level task. The total float time may be obtained by subtracting the earliest time task can start from the latest time task can start without causing a delay in the project's completion. For purposes of disclosure, the "total float time" for a task is defined as the longest possible delay in the completion of the task that will not cause a delay in the completion of the project. The allocation process flow may involve computing a total float time value equal to zero for low-level tasks placed on the critical path.

By identifying the critical path tasks, the system may provide for refining the relative importance for each critical path task relative to the remaining tasks. The present designs allocation algorithm may involve generating an ordered list of all tasks to be performed during the allocation period and sort the ordered list for ranking the tasks based on ranking. Allocate resources 620 mechanisms may build a table containing prioritized tasks, at point 625.

The mechanisms may involve ordering tasks considered more important than other tasks within the project. Each project schedule task may inherit the projects ranking determine from the evaluation method, illustrated in FIG. 4A. The task order may contain all tasks identified to be performed during the allocation period in ranking order. The table may prioritize critical path tasks, originating from the automatic critical path 615 determination for each project schedule from non critical path tasks for approved projects.

If a task is on the critical path, the allocation algorithm may increase the project ranking at the Project Portfolio Manager's discretion, to indicate the tasks is more critical than other tasks within the project, for moving the task higher up in the table containing the prioritized tasks. The system may build a table of all tasks ready for allocation and orders the tasks sorted by ranking order. The method for incrementally increasing the project ranking value for critical path tasks within a project may increase their allocation priority above the priority for non-critical path tasks in the same project. The allocation algorithm may utilize the ranking of projects within the portfolio and tasks within a project's critical path to optimize the allocations.

Project Team Members assigned task from a previous allocation may inform the Project Manager the status of each task they are assigned as to hours expended and whether or not it is completed. The Project Manager may update the schedule to indicate complete tasks and unfinished tasks reported.

The Project Portfolio Manager may directly assign an actual individual to a specific task for a needed labor category. Allocate resources 620 may interpret the direct assignments as pre-allocated labor resources and position the specific tasks first, for consideration during allocation, in the table of prioritized tasks.

The Project Portfolio Manager may identify and designate a preferred individual from a specific labor category for assignment to a specific task. During allocation, prioritized tasks, at point 625, may place the specific tasks indicating a designated preferred individual at a position in the allocation table just below the set of direct assignments. The method for constructing the table of prioritized tasks may place individuals who have completed part of a task, resulting from a previous allocation assignment, below the tasks with pre-specified labor resources, i.e. tasks with directly assigned or preferred labor resources indicated, positioned next in line for automated allocation processing.

Continuing down the table's order of prioritized tasks, the allocation method may place critical path tasks in the table below partially completed tasks. The remaining tasks may be placed at the bottom portion of the table, indicating unassigned tasks deemed non-critical. The algorithm may sort the unassigned task remaining based on priority, from the most important to the least important task.

The system may identify the labor categories, at point 630, needed for allocating the prioritized tasks table, at point 625. The allocation method may assemble an order of candidate individuals available from within each needed labor category. The software generated order, for each required labor category is sorted according productivity, from the most productive individual to the least productive individual.

The system may track staff member productivity during the performance of an allocated task and may assign a productivity factor for the individual staff members. The system may accumulate performance measures for each staff member supporting a labor category, illustrated in FIG. 7. In the situation where an individual has yet to perform on any tasks, the software may assign a productivity factor of one (1.0) for this individual.

The process flow may allocate the pre-specified labor resources assignments for tasks, at point 635, in accordance with the sorted table of prioritized tasks, at point 625. For example, individuals directly assigned tasks by the Project Portfolio Manager are allocated first. Next, the resource allocation processing, at point 635, may allocate a designated preferred individual to a specific task if the individual is still available for allocating. The productivity ranking for individuals within the labor category is not considered during the allocating of pre-specified preferred individuals assignment. The allocation method may include designating staff members in a specific labor category for assignment to the task if there is no other resource available in the labor category. The productivity determined for staff members assessed this designation does not involve the use of labor categories productivity rankings. In some instances, a staff member in a specific labor category may be designated as never assign to a specific task or a particular project. This designation indicates that the individual is not desirable for assignment to a task for a specific project during the allocation period. The resource allocation processing, at point 635, may allocate staff members who have completed part of a task assigned during a preceding allocation period, followed by critical path tasks contained in the table.

The unassigned tasks may be deemed non-critical. The algorithm may sort the remaining unassigned tasks based on priority, from the most important to the least important task. The system may allocate the remaining tasks, at point 640, and assign the most productive resource available for the needed labor category to the highest ranking project tasks. The allocation processing continues to assign the next most productive Project Team Member for the needed labor category until the last task is assigned an actual labor resource. At this point, the allocating processing, at point 640, finishes.

The allocation method may include publishing the assignments generated for each project considered during the allocation period. For example, the process flow may be arranged to automatically generate a report tailored for each Project Portfolio Manager, Project Manager, and Business Analyst, and Project Team Members assigned tasks within the project. The information may present the actual assignments made for the allocation period in directed order as part of a workflow for the individual on the Home page. In a separate report, the system may tailor a report for presenting task assignments for Project Team Members.

After the allocation process occurs in end of business processing, the system updates each user's home page to include a list of tasks assigned to the user. The user at the end of the day updates the "expended" hours in each task he or she has worked on and, if finished, indicates accordingly. The user then may select the "update" option to send his or her task information to the relevant Project Manager and Project Portfolio Manager. The Project Manager and Project Portfolio Manager, on their respective home pages, can either reject the task update, causing the information to be sent back to the Project Team Member with a note, or can update the schedule by accepting the information provided.

An exemplary available personnel database structure, is illustrated in FIG. 6B, for containing the available staff information for each labor category in productivity order. The information may contain the member and a member description for use during the allocation processing.

FIG. 6C illustrates an exemplary labor category database structure for use in accordance with the present design.

FIG. 6D illustrates an exemplary labor resources table listing for an exemplary resource database structure containing information relevant to each task's labor resources.

Figure 7:
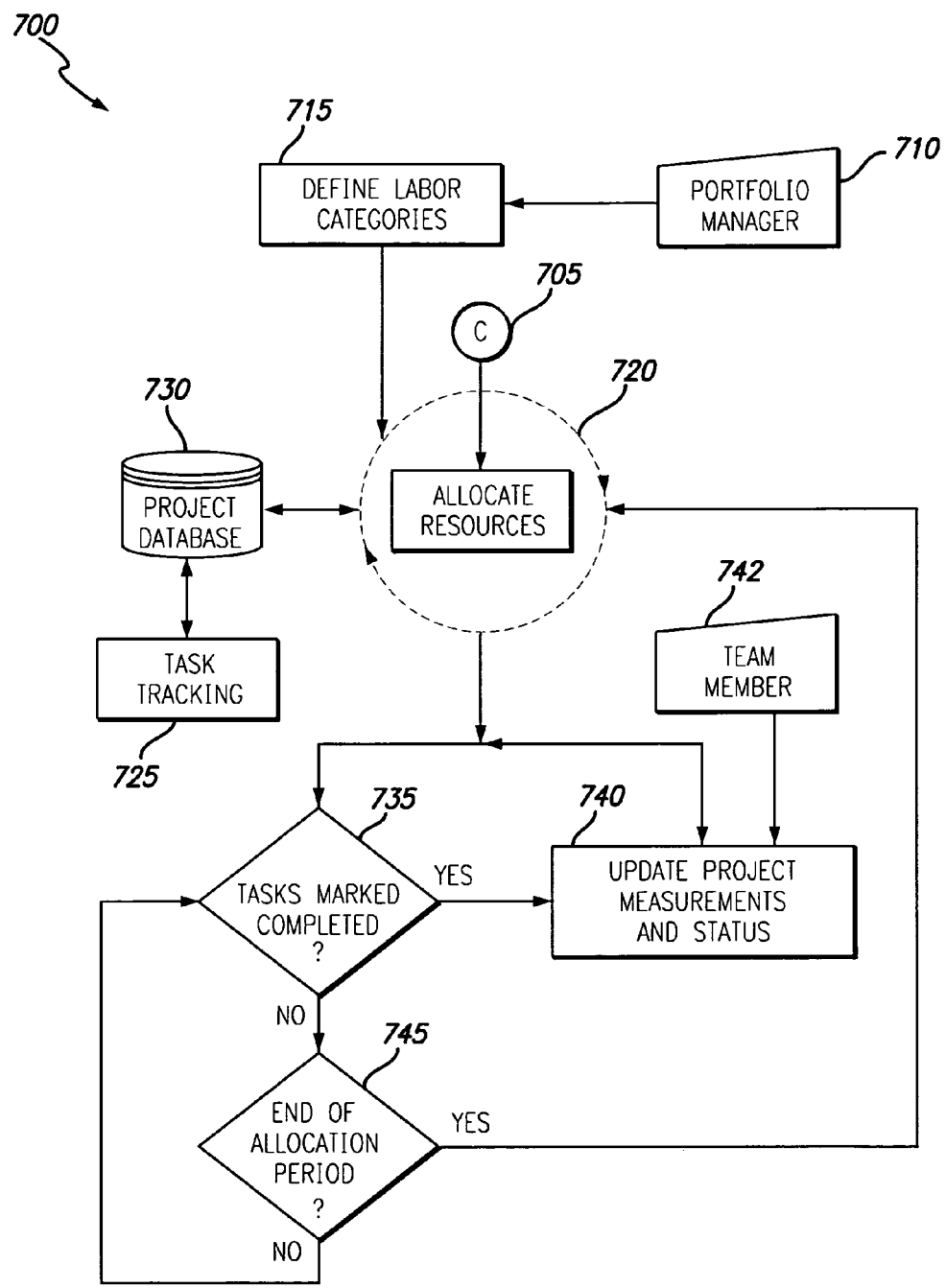
FIG. 7 illustrates a process flow method for determining individual staff member and labor category productivity in accordance with one embodiment of the present design.

The system arrangement, illustrated in FIG. 7, may provide productivity process flow 700 facilities and functions for determining individual staff/team member performance. Project Portfolio Managers may define labor categories needed to support all, i.e. active projects within the organization's project portfolio.

Prior to measuring and calculating performance metrics, Project Portfolio Manager 710 may define labor categories 715. Each individual staff member may satisfy one or multiple the duties and responsibilities associated with each labor category. Prior to executing allocate resources 720 facilities, disclosed above; Project Portfolio Manager or Project Manager may assign generic labor categories, instead of actual individual staff members to the project schedule tasks. The method for assigning generic labor categories for each task may involve estimating the level of effort required for each task assuming a productivity factor of one. The level of effort estimates may involve calculating and applying an average productivity factor for the labor category.

Allocate resources 720 may mechanize assigning labor resources to tasks, in accordance with the Project Portfolio Managers input, such as first allocating the most productive resource to the top ranking tasks. Productivity process flow 700 may continue allocating the next ordered task to the next most productive individual for the allocation period and store the results in project database 730.

In one embodiment, the process flow arrangement may involve task tracking 725 configured for continuously examining project database 730 project contents for identifying tasks marked complete, at point 735. In general, the method for tracking data may involve a data traceability mechanism configured for mapping and relating project data. For example, the traceability mechanism may arrange for requirements to be mapped to schedules and test cases. The system data traceability mechanism may scan the project database for determining when data changes are made.

In general, the present design may track an individual's performance for an assigned task during the allocation period. Task tracking 725 may involve determining a productivity factor, for each team member, from measuring actual performance for each task assigned for each labor category supported. In determining the member's productivity factor, the process flow may consider and include previous performance measurements accumulated from prior allocations for the current year.

The method may involve Project Team Members reporting progress, on a daily basis, for each assigned task, at point 738. Update project status 740 may update the project database for Project Team Members involved in completing a task. Update project status 740 may store the estimated hours and the actual hours expended for team members performing tasks within each labor category.

The productivity process flow may provide for calculating each team members productivity based on the stored data. The productivity process flow system data traceability mechanism may be configured to continuously scan the project database for identifying completed tasks. The continuous scanning may continue for the allocation period, or set time span, duration. The process flow may indicate the need for performing another allocation in the situation where the end of allocation test algorithm, at point 745. In the situation where it is not yet time for a subsequent reallocation, the team members may continue to perform assigned tasks, and the productivity method may continue to accumulate expended hours contributed towards task completion. The process flow may return to identifying tasks marked complete, at point 735. The present design may be configured to recalculate and adjust the productivity factor for individuals supporting a labor category based on each team members reported progress throughout the allocation period.

In one embodiment of the present design, an individual staff member may initially be assigned a default productivity factor of 1.0 if no measurements are available. The productivity algorithm may calculate a productivity factor of 1.0 for an individual performing a task within the estimated time established for the task. In the situation where the individual, completing the assigned task, requires twice the estimated time established may generate a productivity factor of 0.5 for that task. If the individual performs a task in half the estimated time established may generate a productivity factor of 2.0 for that task.

Figure 8A:
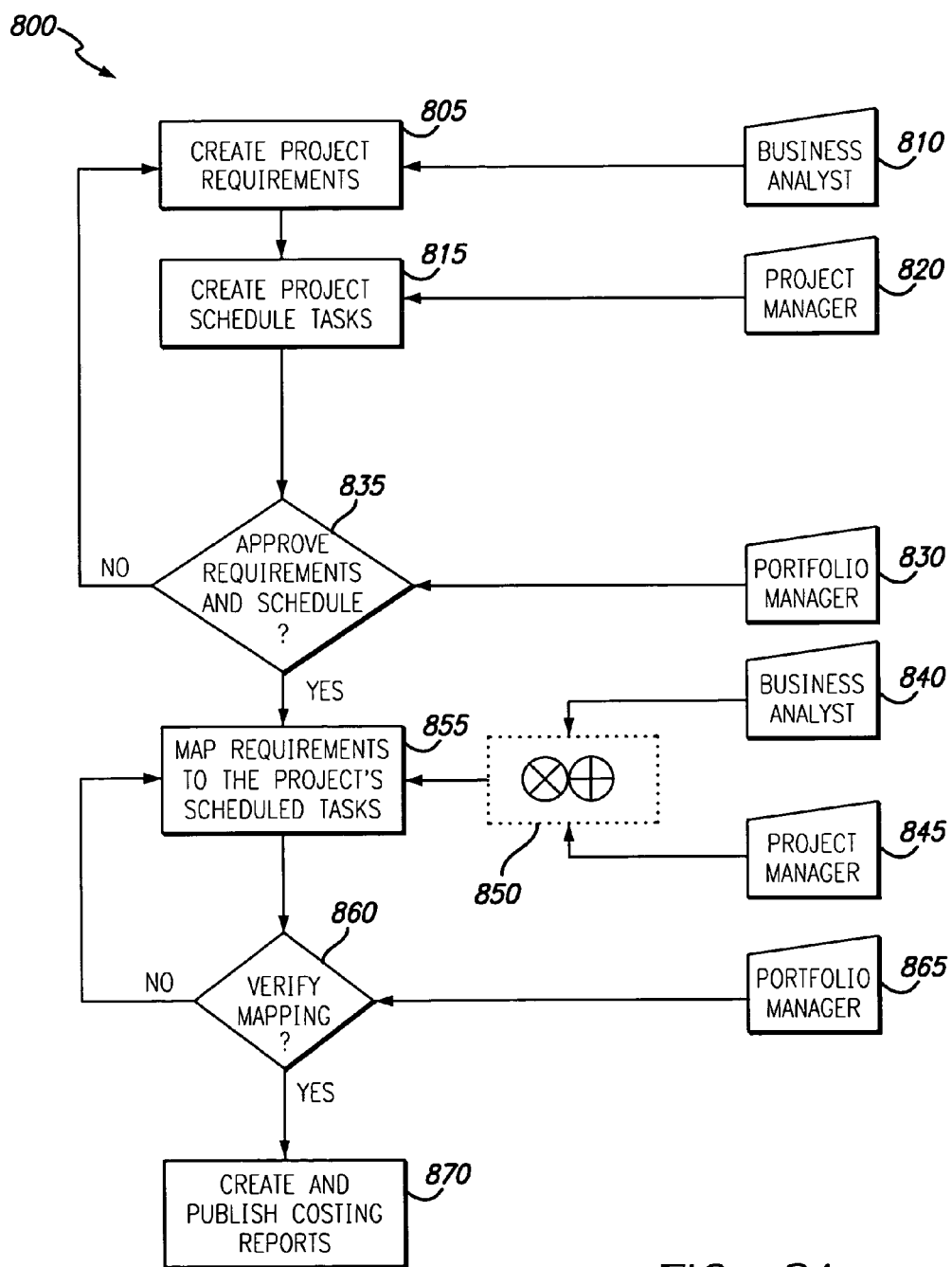
FIG. 8A illustrates a process flow method for a project costing method in accordance with one embodiment of the present design.

FIG. 8A illustrates a process flow for a project costing method for determining project element costs in accordance with one embodiment of the present design. Project element costs may include, but is not limited to, cost of a project requirement, cost-expended-to-date, cost-to-complete, and the total project cost.

Currently industry accepted methods for estimating costs simply rely on formulating a project cost based on previous experiences. In general, project costing estimates are broken down into subsets typically based on a predetermined measured amount or quantity. For example one subset may address a roof replacement cost estimate in the construction industry. The estimate can be formulated based on the size of the activity, and measured in total square feet of surface area candidate for replacement. In the information technology industry, a subset may address developing a software application program from scratch. The computer programming industry typically estimates the number of source-lines-of-code for quantifying and measuring a function, component, module, or some other logical software unit required for characterizing the implementation, such as function points, and the like. The summation of the individual subset costs are used to provide the total estimated project cost.

The system calculates the cost of implementing a project by summing all project schedule tasks. Project costing process flow 800 may provide for mapping tasks to requirements for multiple projects within multiple portfolios. Project requirements 805, created by Business Analyst 810 and project tasks 815 created by Project Manager 820 may be stored for analyzing quality and for approval. Project Portfolio Manager 830 may analyze the requirements and schedules using the methods previously disclosed for establishing a project baseline, illustrated in FIG. 5A. The system may analyze project requirements using the exemplary database structure illustrated in FIG. 8B and each database element may contain a description for each requirement issues determined to have issues. The system may analyze project tasks using the exemplary database structure illustrated in FIG. 8C and each database element may contain a description for each task determined to have issues. On completing the analysis, the Project Portfolio Manager may concur with the Business Analyst and approve the project, at point 835. The system may generate a baseline incorporating the Project Portfolio Manager approved requirements and schedules. The baseline generated by the system, previously illustrated in FIG. 5A, represents approved project requirements 805 from Business Analyst 810, and approved schedule tasks 815, from Project Manager 820.

Business Analyst 840 and Project Manager 845 may jointly or individually, at point 850, map approved low-level requirements to the appropriate schedule tasks, at point 855. The mapping process may involve considering the task features and functions, scheduled milestones, and deliverable items associated with implementing the requirement. The method for mapping may provide for establishing a link or relationship for each low-level task to one or more project requirement(s). In the situation where a requirement is mapped to multiple tasks needed to accomplish the requirement, the Project Manager may specify the percentage amount of each task that is directly involved with the requirement indicated by the mapping.

The process flow may involve analyzing the mappings, generated at point 860, for verifying the low-level tasks are correctly mapped to one or more project tasks and for ensuring the project's low-level tasks are one-hundred percent allocated. In the situation where the costing method cannot verify the entire project's mapping, the software process may return to the mapping activities at point 855. In the situation where Project Portfolio Manager 865 approves the project mappings, the project data is ready for use in determining costs.

The costing method may calculate the total cost of a project, at point 870, or the cost of a specific requirement for projects with verified mappings at point 860. Addition project costs may be determined, at point 870, for reporting the remaining cost for completion for partially completed projects or partially fulfilled requirements. Each low level task's detail may include estimated labor costs and material costs, such as software tools and hardware devices, and inventory consumed, such as office supplies, facility space, and travel.

The costing algorithm process flow, illustrated in FIG. 8A, may provide automated calculation for, including but not limited to, task start and finish dates, and for level-of-effort costs, and costs incurred to date versus percentage of tasks completed.

FIG. 8B illustrates an exemplary requirements analysis database structure for examining the requirement data quality.

FIG. 8C illustrates an exemplary schedules analysis database structure for examining the schedule task data quality.

Thus according to one embodiment of the present design, there is provided a method for allocating labor resources to multiple concurrent projects. The method includes receiving requirements for a plurality of projects at a server, establishing, using the server, one project schedule for each project, each project schedule including a plurality of tasks each having a scheduled completion date using the server, allocating, using the server, a plurality of labor resources to a plurality of tasks in the project schedule of each project based on available labor resources and tasks for each of the plurality of projects, periodically monitoring progress of tasks of each of the plurality of projects using the server, thereby establishing a current project status, by collecting task progress information for each project and comparing task progress information against established project completion criteria, and reallocating selected available labor resources to different tasks based on the project status.

According to another embodiment of the present design, there is provided an apparatus for allocating labor resources in multiple concurrent projects. The apparatus includes a server configured to receive requirements for a plurality of projects, and includes a schedule establishment module configured to establish a project schedule including a plurality of tasks each having a scheduled completion date, a labor resource allocation module configured to allocate a plurality of labor resources to a plurality of tasks in the project schedule of each project based on available labor resources and tasks for each project in the project schedule, a monitoring module configured to periodically monitor progress of tasks of each project, thereby establishing a current project status, by collecting task progress information for each project and comparing task progress information against established project completion criteria, and a labor reallocation module configured to reallocate selected available labor resources to different tasks based on the project status.

In certain circumstances, the periodically monitoring comprises identifying issues with estimated completion of tasks in the project schedule and selectively change at least one of one labor resource, one task, and one task completion date when estimated completion of at least one task is delinquent. Establishing the schedule may further comprise evaluating tasks and removing ambiguities from the tasks, and providing selected tasks having ambiguities removed to project management personnel for evaluation. The method may include evaluating efficiency of each labor resource as each project progresses and providing selected efficiency information for selected labor resources to project management personnel.

In the present design, each task may correspond to a requirement, and the method further comprises linking low level tasks to low level project requirements, wherein each low level task represents one task without a required sub-task and each low level requirement represents one requirement without a sub-requirement. Cost of each project is based on low level requirements linked to low level tasks.

While primarily described herein with respect to an exemplary system and method for resource allocation in a multiple concurrent active project scenario, the invention and disclosure herein are not intended to be so limited. As noted, the present design may be employed in a variety of scenarios, further including but not limited to projects for information technology, engineering, construction, research projects, and projects where it is desirable to assign labor resources for tasks and each tasks has a definitive or relative start date and a projected completion date, and so forth.

Note that while certain examples are provided herein, these examples are meant to be illustrative and not limiting as to the functionality of the present system and method. Other examples and implementations are possible and this document should not be limited by the examples presented. Other examples of resource allocation may be realized using the current design.

By the foregoing description, an improved system and method for enhanced automated resource allocation have been described. The improved system and method may be substantially or completely internet based such that the user can access the system server to request project information, such as reports, and modify the systems database contents from a platform providing, for example, internet browsing capabilities.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A method configured to be executed using a processor, the method comprising:
   determining ranking of projects in an organization's portfolio of projects by assessing project selection criteria and weighting factors provided by organization members to provide a numerical prioritization of projects in the organization's portfolio;
   specifying requirements for a plurality of projects, wherein the requirements include at least one low-level requirement, and each low-level requirement is implemented by one or more low-level project tasks;
   linking each low-level requirement to one or more low-level project tasks, wherein each low-level project task represents a project task without a sub-task and each low-level requirement represents a requirement without a sub-requirement;
   establishing project schedules using labor categories for project schedule tasks requiring labor resources, wherein each project schedule comprises a plurality of tasks;
   determining a task priority of each task in each project based on:
      the numerical ranking of each project associated with a given task;
      existence of each task on a critical path of an associated project; and
      a requirement associated with each task in each project;
   determining, using the processor, each project team member's productivity for each supported labor category based at least in part on each project team member's number of hours worked per task in each supported labor category versus estimated number of hours required per task in each supported labor category; and
   allocating project team members to project tasks using the processor at end of business each business day based on each project team member's productivity and the task priority of each task in each of the multiple concurrent projects such that each time project team members are allocated, a set of most important project tasks receive a group of most productive available project team members for the project task's specified labor categories, subject to project priorities.

2. The method of claim 1, wherein the allocating project team members to project tasks comprises identifying issues with estimated completion of project tasks in the project schedule and enabling alteration of at least one of project team members, project tasks, and order of project tasks when estimated completion of a deliverable or milestone project task is projected to be delinquent.

3. The method of claim 1, wherein establishing the project schedules further comprises evaluating requirements and removing ambiguities from the requirements.

4. The method of claim 3, further comprising providing requirements having ambiguities to key project stakeholders for examination, evaluation and resolution.

5. The method of claim 1, further comprising:
   evaluating productivity of each project team member as each project task is completed;
   providing productivity information of project team members to key project stakeholders; and
   employing the evaluated productivity in the allocating of project team members.

6. The method of claim 1, wherein cost of each project and cost of the project's requirements is determined based on low-level requirements linked to low-level project tasks.

7. A computerized apparatus comprising a processor, the computing apparatus configured to allocate project team members to multiple concurrent projects, comprising:
   a project scoring module configured to determine a numerical ranking of projects in an organization's project portfolio based on project selection criteria and weighting factors provided by organization members, wherein requirements are specified for a plurality of projects, wherein the requirements include at least one low-level requirement, and each low-level requirement corresponds to one or more low-level project tasks and the computerized communication platform is configured to link low-level requirements to one or more low-level project tasks, wherein each low-level project tasks represents a project task without a sub-task and each low-level requirement represents a requirement without a sub-requirement;

a labor resource allocation module configured to allocate a plurality of project team members in productivity order for each supported labor category to a plurality of project tasks based on a task priority of each task in each project in the project schedule based on available project team members and tasks for each project in the project schedule for the multiple concurrent projects, wherein the task priority of each task in each project is based on:

the numerical ranking of each project associated with a given task;

existence of each task on a critical path of an associated project; and a requirement associated with each task in each project;

a monitoring module configured to periodically monitor completion and progress of project tasks, thereby establishing a current project task status, by collecting project task progress information for each project team member and comparing project task progress information against established project task completion criteria; and a labor allocation module configured to allocate available project team members to project tasks based on importance of project tasks and productivity of project team members for supported labor categories, subject to project priorities based on the numerical prioritization of projects in the organizations' project portfolio;

wherein productivity is determined by the processor based at least in part on each project team member's number of hours worked per task in each supported labor category versus estimated number of hours required per task in each supported labor category, and wherein the labor allocation module is configured to allocate available project team members at end of business each business day based on productivity of each project team member such that each time project team members are allocated, a set of most important project tasks receive a group of most productive available project team members for the project task's supported labor categories.

8. The computerized apparatus of claim 7, wherein the monitoring module is configured to identify issues with estimated completion of project tasks in the project schedule and selectively change at least one of a labor resource, a project task, and a sequence of project tasks when estimated completion of a project task will be delinquent.

9. The computerized apparatus of claim 8, wherein the monitoring module further determines which project tasks have issues, and the issues are presented to key project stakeholders for evaluation and resolution.

10. The computerized apparatus of claim 7, further comprising a requirements analysis module configured to evaluate requirements and remove ambiguities from the requirements.

11. The computerized apparatus of claim 7, wherein the monitoring module is configured to evaluate productivity of each project team member as each project task is completed to provide productivity information for selected key project stakeholders and to the allocation process.

12. The computerized apparatus of claim 7, wherein cost of each project is based on low-level requirements linked to low-level project tasks.

13. A method implemented in a computerized apparatus comprising a processor, the method comprising:

determining a ranking of each project in an organization's portfolio using the computerized apparatus by assessing project selection criteria and weighting factors provided by organization members to provide a numerical prioritization of projects in the organization's portfolio;

specifying requirements, wherein the requirements include at least one low-level requirement, and each low-level requirement corresponds to one or more low-level project tasks;

linking low-level requirements to low-level project tasks, wherein each low-level project task represents a project task without a sub-task and each low-level requirement represents a requirement without a sub-requirement;

establishing project schedules including a plurality of project tasks for each project in the portfolio, wherein each project schedule comprises a plurality of tasks;

determining a task priority of each task in each project based on:

the numerical ranking of each project associated with a given task;

existence of each task on a critical path of an associated project; and a requirement associated with each task in each project;

determining productivity of each project team member for each supported labor category;

allocating a plurality of project team members in productivity order for each supported labor category to a plurality of project tasks in task priority order for all projects in the portfolio based on available project team members sorted in productivity order using the computerized apparatus, subject to project priorities based on the numerical prioritization of projects in the organization's project portfolio; and at end of business each business day:

monitoring progress of all allocated project tasks for all projects in the portfolio, thereby establishing a current project task status relative to percentage complete; and reallocating available project team members sorted in priority order to all project tasks based on an importance of the project task, each project team member's project experience in the project task and experience to date for the project task, and a productivity in each supported labor category of available project team members for each task, subject to project priorities;

wherein productivity is determined by the processor based at least in part on each project team member's number of hours worked per task in each supported labor category versus estimated number of hours required per task in each supported labor category.

14. The method of claim 13, wherein the allocating the plurality of project team members comprises identifying issues with estimated completion of deliverable and milestone project tasks in the project schedule and warning key project stakeholders when at least one deliverable or milestone project task is projected to be delinquent.

15. The method of claim 13, further comprising evaluating productivity of each project team member as each project task is completed and providing productivity information for all project team members to key project stakeholders and allocation process.

16. The method of claim 13, wherein cost of each project is based on low-level requirements and low-level project tasks.

* * * * *